United States Patent
Song et al.

(10) Patent No.: US 10,200,728 B2
(45) Date of Patent: Feb. 5, 2019

(54) TRANSMITTING/RECEIVING SYSTEM AND METHOD OF PROCESSING DATA IN THE TRANSMITTING/RECEIVING SYSTEM

(71) Applicant: LG Electronics Inc., Seoul (KR)

(72) Inventors: Jae Hyung Song, Seoul (KR); Jin Pil Kim, Seoul (KR); Jong Yeul Suh, Seoul (KR); Chul Soo Lee, Seoul (KR); In Hwan Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/583,839

(22) Filed: May 1, 2017

(65) Prior Publication Data

US 2017/0238024 A1 Aug. 17, 2017

Related U.S. Application Data

(63) Continuation of application No. 14/996,787, filed on Jan. 15, 2016, now Pat. No. 9,686,573, which is a
(Continued)

(30) Foreign Application Priority Data

Aug. 25, 2008 (KR) .......................... 10-2008-0082951
Jun. 17, 2009 (KR) .......................... 10-2009-0053950

(51) Int. Cl.
*H04N 21/2362* (2011.01)
*H04N 21/6437* (2011.01)
(Continued)

(52) U.S. Cl.
CPC ......... *H04N 21/2362* (2013.01); *H04L 27/02* (2013.01); *H04N 21/235* (2013.01);
(Continued)

(58) Field of Classification Search
CPC combination set(s) only.
See application file for complete search history.

(56) References Cited

U.S. PATENT DOCUMENTS 5,469,431 A 11/1995 Wendorf et al.
7,996,868 B2 8/2011 Sicher et al.
(Continued)

FOREIGN PATENT DOCUMENTS

EP 1628420 2/2006
KR 10-2007-0077000 7/2007
(Continued)

OTHER PUBLICATIONS

Korean Intellectual Property Office Application Serial No. 10-2009-0053950, Notice of Allowance dated Nov. 20, 2015, 2 pages.
(Continued)

*Primary Examiner* — Alexander Gee
(74) *Attorney, Agent, or Firm* — Lee Hong Degerman Kang & Waimey

(57) ABSTRACT

A receiving system and a data processing method are disclosed. The receiving system includes a receiving unit, a demodulator, a first handler, and a second handler. The receiving unit receives a broadcast signal including fast information channel (FIC) data, mobile service data, and a service signaling channel, the FIC data including a field indicating that a table signaling service guide bootstrap information to the service signaling channel is included therein, and the mobile service data and the service signaling channel are packetized into an RS frame belonging to a desired ensemble. The demodulator demodulates the received broadcast signal. The first handler acquires service guide bootstrap information from the table included in the
(Continued)

service signaling channel. And, the second handler accesses a service guide announcement channel by using the service guide bootstrap information.

8 Claims, 15 Drawing Sheets

Related U.S. Application Data continuation of application No. 14/035,657, filed on Sep. 24, 2013, now Pat. No. 9,277,290, which is a continuation of application No. 12/487,095, filed on Jun. 18, 2009, now Pat. No. 8,572,648.

(60) Provisional application No. 61/076,685, filed on Jun. 29, 2008, provisional application No. 61/073,729, filed on Jun. 18, 2008.

(51) Int. Cl.
  H04N 21/235 (2011.01)
  H04N 21/643 (2011.01)
  H04L 27/02 (2006.01)
  H04N 21/236 (2011.01)
  H04N 21/435 (2011.01)
  H04N 21/84 (2011.01)

(52) U.S. Cl.
  CPC ... *H04N 21/2353* (2013.01); *H04N 21/23614* (2013.01); *H04N 21/435* (2013.01); *H04N 21/6437* (2013.01); *H04N 21/64315* (2013.01); *H04N 21/64322* (2013.01); *H04N 21/84* (2013.01)

(56) References Cited

U.S. PATENT DOCUMENTS

| | | | |
|---|---|---|---|
| 8,024,725 B2 | 9/2011 | Kim et al. | |
| 2003/0035411 A1* | 2/2003 | Moy | H04Q 11/0062 370/352 |
| 2005/0152359 A1* | 7/2005 | Giesberts | H04L 1/0083 370/389 |
| 2005/0262419 A1 | 11/2005 | Becker et al. | |
| 2005/0289586 A1* | 12/2005 | Park | H04H 60/13 725/31 |
| 2006/0174271 A1* | 8/2006 | Chen | H04H 60/25 725/39 |
| 2006/0225093 A1* | 10/2006 | Huttunen | H04N 21/235 725/39 |
| 2007/0055786 A1* | 3/2007 | Pohjolainen | H04N 21/235 709/230 |
| 2007/0143781 A1 | 6/2007 | Jo | |
| 2008/0005767 A1 | 1/2008 | Seo | |
| 2008/0008175 A1 | 1/2008 | Park | |
| 2008/0046926 A1 | 2/2008 | Jeon et al. | |
| 2008/0072259 A1 | 3/2008 | Seo et al. | |
| 2008/0148318 A1 | 6/2008 | Jung et al. | |
| 2008/0199021 A1 | 8/2008 | Park | |
| 2008/0201746 A1 | 8/2008 | Xu et al. | |
| 2008/0225799 A1 | 9/2008 | Lee et al. | |
| 2009/0077591 A1 | 3/2009 | Jeon et al. | |
| 2009/0199283 A1 | 8/2009 | Jain | |
| 2009/0235141 A1 | 9/2009 | Shelby et al. | |
| 2009/0328099 A1 | 12/2009 | Praden et al. | |
| 2010/0011397 A1 | 1/2010 | Baran et al. | |
| 2010/0149427 A1 | 6/2010 | Limberg | |
| 2010/0319022 A1 | 12/2010 | Praden | |
| 2011/0093880 A1 | 4/2011 | Paila et al. | |
| 2011/0222494 A1 | 9/2011 | Lee et al. | |
| 2016/0134903 A1 | 5/2016 | Song et al. | |

FOREIGN PATENT DOCUMENTS

| | | |
|---|---|---|
| KR | 10-2007-0079927 | 8/2007 |
| KR | 10-2007-0113439 | 11/2007 |
| KR | 10-2007-0117891 | 12/2007 |
| KR | 10-2008-0053813 | 6/2008 |
| WO | 2007/066997 | 6/2007 |

OTHER PUBLICATIONS

Korean Intellectual Property Office Application Serial No. 10-2016-0115294, Notice of Allowance dated Oct. 11, 2016, 3 pages.

* cited by examiner

FIG. 7

| Syntax | No. of Bits |
|---|---|
| FIC_chunk() {<br>  FIC_chunk_header()<br>  FIC_chunk_payload()<br>} | <br>5*8<br>var |

FIG. 8

| Syntax | No. of Bits | Format |
|---|---|---|
| FIC_chunk_header() {  |  |  |
|   FIC_major_protocol_version | 2 | uimsbf |
|   FIC_minor_protocol_version | 3 | uimsbf |
|   FIC_chunk_header_extension_length | 3 | uimsbf |
|   ensemble_loop_header_extension_length | 3 | uimsbf |
|   MH_service_loop_extension_length | 3 | uimsbf |
|   current_next_indicator | 1 | bsblf |
|   transport_stream_id | 16 | uimsbf |
|   SG_version | 1 | bsblf |
|   num_ensembles | 8 | uimsbf |
|   ESG_EntryPoint_Location | 8 | uimsbf |
| } |  |  |

FIG. 9

| Syntax | No. of Bits | Format |
|---|---|---|
| FIC_chunk_payload() { | | |
|   for (i=0; i<num_ensembles; i++) { | | |
|     ensemble_id | 8 | uimsbf |
|     reserved | 3 | '111' |
|     SG_entry_point_indicator | 1 | bslbf |
|     SMT version | 5 | uimsbf |
|     num_MH_services | 8 | uimsbf |
|     for (j=0; j<num_MH_services; j++) { | | |
|       MH_service_id | 16 | uimsbf |
|       MH_service_type | 5 | uimsbf |
|       multi_ensemble_service | 2 | uimsbf |
|       MH_service_status | 2 | uimsbf |
|       SP_indicator | 1 | bslbf |
|     } | | |
|   } | | |
|   FIC_chunk_stuffing() | var | |
| } | | |

FIG. 10

| Syntax | No. of Bits | Format |
|---|---|---|
| FIC_segment_header() { | | |
|   FIC_type | 2 | uimsbf |
|   reserved | 5 | '11111' |
|   error_indicator | 1 | bslbf |
|   FIC_segment_num | 4 | uimsbf |
|   FIC_last_segment_num | 4 | uimsbf |
| } | | |

FIG. 11

| Syntax | No.of Bits | Format |
|---|---|---|
| service_map_table_section() { | | |
|   table_id | 8 | 0xDB |
|   section_syntax_indicator | 1 | '0' |
|   private_indicator | 1 | '1' |
|   reserved | 2 | '11' |
|   section_length | 12 | uimsbf |
|   table_id_extension { | | |
|     SMT_protocol_version | 8 | uimsbf |
|     ensemble_id | 8 | uimsbf |
|   } | | |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   num_MH_services | 8 | uimsbf |
|   for (i=0;i< num_MH_services; i++) { | | |
|     MH_service_id | 16 | uimsbf |
|     multi_ensemble_service | 2 | uimsbf |
|     MH_service_status | 2 | uimsbf |
|     SP_indicator | 1 | bslbf |
|     short_MH_service_name_length /*m*/ | 3 | uimsbf |
|     short_MH_service_name | 16*m | |
|     reserved | 2 | '11' |
|     MH_service_category | 6 | uimsbf |
|     num_components | 5 | uimsbf |
|     IP_version_flag | 1 | bslbf |
|     source_IP_address_flag | 1 | bslbf |
|     MH_service_destination_IP_address_flag | 1 | bslbf |
|     if(source_IP_address_flag) | | |
|       source_IP_address | 32 or 128 | uimsbf |
|     if (MH_service_destination_IP_address_flag) | | |
|       MH_service_destination_IP_address | 32 or 128 | uimsbf |
|     for (j=0;j< num_components; j++) | | |
|     { | | |
|       reserved | 1 | '1' |
|       essential_component_indicator | 1 | bslbf |
|       component_destination_IP_address_flag | 1 | bslbf |
|       port_num_count | 5 | uimsbf |
|       component_destination_UDP_port_num | 16 | uimsbf |
|       if (component_destination_IP_address_flag) | | |
|         component_destination_IP_address | 32 or 128 | uimsbf |
|       reserved | 4 | '1111' |
|       num_component_level_descriptors | 4 | uimsbf |
|       for (k=0;k< num_components_level_descriptors; k++) | | |
|       { | | |
|         component_level_descriptor() | var | |
|       } | | |
|     } | | |
|     reserved | 4 | '1111' |
|     num_MH_service_level_descriptors | 4 | uimsbf |
|     for (m=0; m<num_MH_service_level_descriptors; m++) { | | |
|       MH_service_level_descriptor() | var | |
|     } | | |
|   } | | |
|   reserved | 4 | '1111' |
|   num_ensemble_level_descriptors | 4 | uimsbf |
|   for (n=0; n<num_ensemble_level_descriptors; n++) { | | |
|     ensemble_level_descriptor() | var | |
|   } | | |
| } | | |

FIG. 12

| Syntax | No. of Bits | Format |
|---|---|---|
| SG_Access_Descriptor() { | | |
| descriptor_tag | 8 | TBD |
| descriptor_length | 8 | uimsbf |
| IP_version_flag | 1 | bsblf |
| address_count | 7 | uimsbf |
| destination_IP_address | 32 or 128 | uimsbf |
| destination_UDP_port_num | 16 | |
| announcement_channel_TSI | 16 | uimsbf |
| } | | |

FIG. 16

| Syntax | No. of Bits | Format |
|---|---|---|
| guide_access_table_section() { | | |
|   table_id | 8 | TBD |
|   section_syntax_indicator | 1 | '0' |
|   private_indicator | 1 | '1' |
|   reserved | 2 | '11' |
|   section_length | 12 | uimsbf |
|   table_id_extension{ | | |
|     GAT_protocol_version | 8 | uimsbf |
|     ensemble_id | 8 | uimsbf |
|   } | | |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   num_SG_providers | 8 | uimsbf |
|   for (i=0;i< num_SG_providers; i++){ | | |
|     SG_provider_id | 8 | uimsbf |
|     SG_provider_name_length | 8 | uimsbf |
|     SG_provider_name_text() | var | |
|     num_entry_points | 8 | uimsbf |
|     for (j=0;j< num_entry_points; j++){ | | |
|       source_IP_address | 32 | uimsbf |
|       IP_version_flag | 1 | bslbf |
|       destination_IP_address | 32 or 128 | uimsbf |
|       destination_UDP_port_num | 16 | uimsbf |
|       announcement_channel_TSI | 16 | uimsbf |
|     } | | |
|   } | | |
| } | | |

TRANSMITTING/RECEIVING SYSTEM AND METHOD OF PROCESSING DATA IN THE TRANSMITTING/RECEIVING SYSTEM

This application is a continuation of U.S. patent application Ser. No. 14/996,787, filed on Jan. 15, 2016, now U.S. Pat. No. 9,686,573, which is a continuation of U.S. patent application Ser. No. 14/035,657, filed on Sep. 24, 2013, now U.S. Pat. No. 9,277,290, which is a continuation of U.S. patent application Ser. No. 12/487,095, filed on Jun. 18, 2009, now U.S. Pat. No. 8,572,648, which claims the benefit of earlier filing date and right of priority to Korean Patent Application Nos. 10-2008-0082951, filed on Aug. 25, 2008, and 10-2009-0053950, filed on Jun. 17, 2009, and also claims the benefit of U.S. Provisional Application No. 61/073,729, filed on Jun. 18, 2008, and 61/076,685, filed on Jun. 29, 2008, the contents of which are all hereby incorporated by reference herein in their entirety.

BACKGROUND OF THE INVENTION

Field of the Invention

The present invention relates to a transmitting system for transmitting a digital broadcasting signal, a receiving system (or receiver) for receiving the digital broadcasting signal transmitted from the transmitting system, and a method of processing data in the transmitting system and the receiving system (or receiver).

Discussion of the Related Art

The Vestigial Sideband (VSB) transmission mode, which is adopted as the standard for digital broadcasting in North America and the Republic of Korea, is a system using a single carrier method. Therefore, the receiving performance of the receiving system may be deteriorated in a poor channel environment. Particularly, since resistance to changes in channels and noise is more highly required when using portable and/or mobile broadcast receivers, the receiving performance may be even more deteriorated when transmitting mobile service data by the VSB transmission mode.

SUMMARY OF THE INVENTION

Accordingly, the present invention is directed to a digital broadcasting transmitting/receiving system and a data processing method that substantially obviate one or more problems due to limitations and disadvantages of the related art.

An object of the present invention is to provide a digital broadcasting transmitting/receiving system and a data processing method that are highly resistant to channel changes and noise.

Another object of the present invention is to provide a digital broadcast transmitting/receiving system and data processing method that can signal service guide information by using a fast information channel (FIC).

Another object of the present invention is to provide a digital broadcast transmitting/receiving system and data processing method that can signal service guide information by using a service signaling channel.

A further aspect of the present invention is to provide a digital broadcast transmitting/receiving system and data processing method that can receive service guide information by using signaling information of a FIC and signaling information of a service signaling channel.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a data processing method in a receiving system includes the steps of receiving a broadcast signal including fast information channel (FIC) data, mobile service data, and a service signaling channel, the FIC data including a field indicating that a table signaling service guide bootstrap information to the service signaling channel is included therein, and the mobile service data and the service signaling channel are packetized into an RS frame belonging to a desired ensemble, demodulating the received broadcast signal, acquiring service guide bootstrap information from the table included in the service signaling channel, and accessing a service guide announcement channel by using the service guide bootstrap information.

Herein, the broadcast signal may further include transmission parameter channel (TPC) data including FIC version information, wherein the FIC version information is capable of identifying an update in the FIC data.

The data processing method may further include accessing the service guide announcement channel, thereby acquiring service guide management information, and receiving service guide information based upon access information of the service guide information included in the acquired service guide management information. Herein, the service guide management information may include a service guide delivery descriptor (SGDD).

The FIC data may be configured of a 5-byte FIC chunk header and a variable length FIC chunk payload, and the field to indicate may be included in at least one of the FIC chunk header and the FIC chunk payload. Also, the service guide bootstrap information may be signaled to a descriptor of a service map table (SMT) included in the service signaling channel. Furthermore, the service guide bootstrap information may be signaled to at least one field of a guide access table (GAT) included in the service signaling channel.

In another aspect of the present invention, a receiving system includes a receiving unit, a demodulator, a first handler, and a second handler. The receiving unit receives a broadcast signal including fast information channel (FIC) data, mobile service data, and a service signaling channel, the FIC data including a field indicating that a table signaling service guide bootstrap information to the service signaling channel is included therein, and the mobile service data and the service signaling channel are packetized into an RS frame belonging to a desired ensemble. The demodulator demodulates the received broadcast signal. The first handler acquires service guide bootstrap information from the table included in the service signaling channel. And, the second handler accesses a service guide announcement channel by using the service guide bootstrap information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incor- In the drawings:

FIG. 7 illustrates a syntax structure of an FIC chunk according to an embodiment of the present invention;

FIG. 8 illustrates a syntax structure of an FIC chunk header according to an embodiment of the present invention;

FIG. 9 illustrates a syntax structure of an FIC chunk payload according to an embodiment of the present invention;

FIG. 10 illustrates a syntax structure of an FIC segment header according to an embodiment of the present invention;

FIG. 11 illustrates a syntax structure of a service map table (SMT) section according to an embodiment of the present invention;

FIG. 12 illustrates a syntax structure of a service guide (SG) access descriptor included in the SMT according to an embodiment of the present invention;

FIG. 16 illustrates a syntax structure of a guide access table (GAT) section according to an embodiment of the present invention.

DETAILED DESCRIPTION OF THE INVENTION

Figure 1:
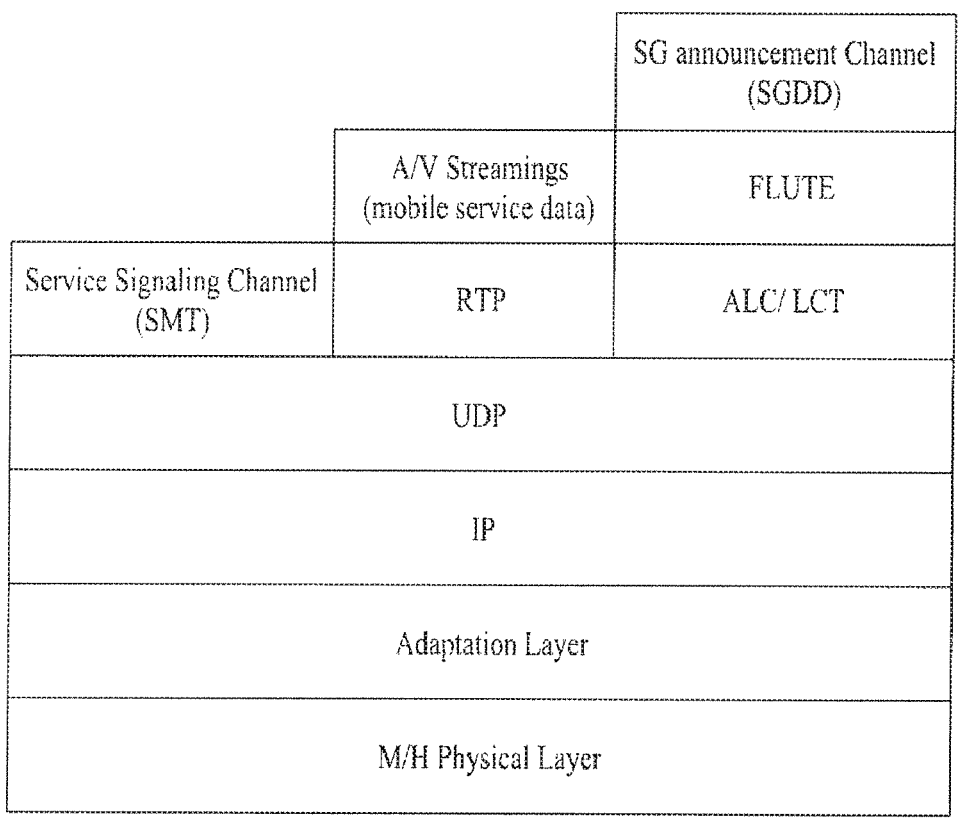
FIG. 1 illustrates a protocol stack for mobile service according to an embodiment of the present invention.

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

Among the terms used in the description of the present invention, main service data correspond to data that can be received by a fixed receiving system and may include audio/video (A/V) data. More specifically, the main service data may include A/V data of high definition (HD) or standard definition (SD) levels and may also include diverse data types required for data broadcasting. Also, the known data correspond to data pre-known in accordance with a pre-arranged agreement between the receiving system and the transmitting system.

Additionally, among the terms used in the present invention, "M/H" (or MH) corresponds to the initials of "mobile" and "handheld" and represents the opposite concept of a fixed-type system. Furthermore, the M/H service data may include at least one of mobile service data, and handheld service data, and will also be referred to as "mobile service data" for simplicity. Herein, the mobile service data not only correspond to M/H service data but may also include any type of service data with mobile or portable characteristics. Therefore, the mobile service data according to the present invention are not limited only to the M/H service data. Also, data required for mobile service according to the present invention will also be referred to as "mobile service data" for simplicity.

The above-described mobile service data may correspond to data having information, such as program execution files, stock information, and so on, and may also correspond to A/V data. Most particularly, the mobile service data may correspond to A/V data having lower resolution and lower data rate as compared to the main service data. For example, if an A/V codec that is used for a conventional main service corresponds to a MPEG-2 codec, a MPEG-4 advanced video coding (AVC) or scalable video coding (SVC) having better image compression efficiency may be used as the A/V codec for the mobile service. Furthermore, any type of data may be transmitted as the mobile service data. For example, transport protocol expert group (TPEG) data for broadcasting real-time transportation information may be transmitted as the main service data.

Also, a data service using the mobile service data may include weather forecast services, traffic information services, stock information services, viewer participation quiz programs, real-time polls and surveys, interactive education broadcast programs, gaming services, services providing information on synopsis, character, background music, and filming sites of soap operas or series, services providing information on past match scores and player profiles and achievements, and services providing information on product information and programs classified by service, medium, time, and theme enabling purchase orders to be processed. Herein, the present invention is not limited only to the services mentioned above. In the present invention, the transmitting system provides backward compatibility in the main service data so as to be received by the conventional receiving system. Herein, the main service data and the mobile service data are multiplexed to the same physical channel and then transmitted.

In the present invention, the transmitting system provides backward compatibility in the main service data so as to be received by the conventional receiving system. Herein, the main service data and the mobile service data are multiplexed to the same physical channel and then transmitted.

Furthermore, the transmitting system according to the present invention performs additional encoding on the mobile service data and inserts the data already known by the receiving system and transmitting system (e.g., known data), thereby transmitting the processed data.

Therefore, when using the transmitting system according to the present invention, the receiving system may receive the mobile service data during a mobile state and may also receive the mobile service data with stability despite various distortion and noise occurring within the channel.

According to an embodiment of the present invention, the transmitting system and the receiving system operate two different types of data channels: an RS frame data channel for transmitting contents and a fast information channel (FIC) data channel for acquisiting service.

More specifically, the present invention can signal mapping information between an ensemble and a mobile service by using an FIC chunk, and can divide and transmit the FIC chunk into FIC segment units, thereby enabling a receiving system to perform quick service acquisition.

FIG. 1 illustrates a protocol stack for providing mobile services in an IP basis according to an embodiment of the present invention.

More specifically, in the transmitting system, the mobile service data (e.g., A/V steaming) are packetized based upon a real time protocol (RTP) method. The RTP packet is then packetized once again based upon a user datagram protocol (UDP) method. Thereafter, the RTP/UDP packet is in turn packetized based upon an IP method, thereby being packetized into RTP/UDP/IP packet data. In the description of the present invention, the packetized RTP/UDP/IP packet data will be referred to as an IP datagram for simplicity.

Furthermore, service information for receiving mobile services may be provided in the form of a table. And, a service signaling channel transmitting such tables (e.g., service map table (SMT)) is packetized based upon a UDP method. And, the packetized UDP data are then packetized based upon an IP method, thereby being packetized into UDP/IP data. In the description of the present invention, the packetized UDP/IP packet data will also be referred to as an IP datagram for simplicity. According to an embodiment of the present invention, the service signaling channel is encapsulated into an IP datagram having a well-known destination IP address and a well-known destination UDP port number.

According to an embodiment of the present invention, an RS frame is formed by gathering the IP datagrams in the adaptation layer, and data of the RS frame are distributed to a plurality of data groups. Thereafter, in a mobile physical layer, the distributed data modulated by using a predetermined transmission method, e.g., a VSB transmission method, thereby transmitting the modulated data. According to the embodiment of the present invention, an FIC segment is included in each of the data groups. The relation between the RS Frame and the FIC segment will be described in detail in a later process.

Meanwhile, a service guide delivery descriptor (SGDD) including access information of announcement information for mobile services may be included in the RS frame so as to be transmitted. According to an embodiment of the present invention, the SGDD is transmitted through a service guide announcement channel. According to an embodiment of the present invention, the service guide announcement channel is packetized based upon a file transfer protocol (FTP) method, a File Delivery over Unidirectional Transport (FLUTE) method. The packetized data are then packetized based upon an asynchronous layered coding/layered coding transport (ALC/LCT) method. Thereafter, the packetized ALC/LCT data are in turn packetized based upon a UDP method, thereby being packetized into ALC/LCT/UDP packet data and included in the RS frame. More specifically, the RS frame may include at least one of an IP datagram of mobile service data, an IP datagram of a service signaling channel, and an IP datagram of a service guide announcement channel.

In the description of the present invention, a collection (or group) of consecutive RS frames having the same forward error correction (FEC) codes will be referred to as an ensemble.

According to an embodiment of the present invention, information that can identify an ensemble including an entry point of a service guide (i.e., SGDD) is signaled to the FIC.

According to the embodiment of the present invention, access information of the service guide announcement channel is signaled to the service signaling channel included in the ensemble identified by the FIC.

According to an embodiment of the present invention, access information of the service guide announcement channel includes service guide bootstrap information. More specifically, the service guide bootstrap information corresponds to information required for bootstrapping the service guide of a mobile service. The service guide bootstrap information includes access information of a FLUTE session (e.g., TSI) that transmits the service guide announcement channel.

According to the embodiment of the present invention, access information of the service guide announcement channel is signaled through a table included in the service signaling channel. The table may correspond to a service map table (SMT) or to a guide access table (GAT). In the description of the present invention, the data included in the RS frame will also be referred to as mobile service data for simplicity.

Data Format Structure

Meanwhile, the data structure used in the mobile broadcasting technology according to the embodiment of the present invention may include a data group structure and an RS frame structure, which will now be described in detail.

Figure 2:
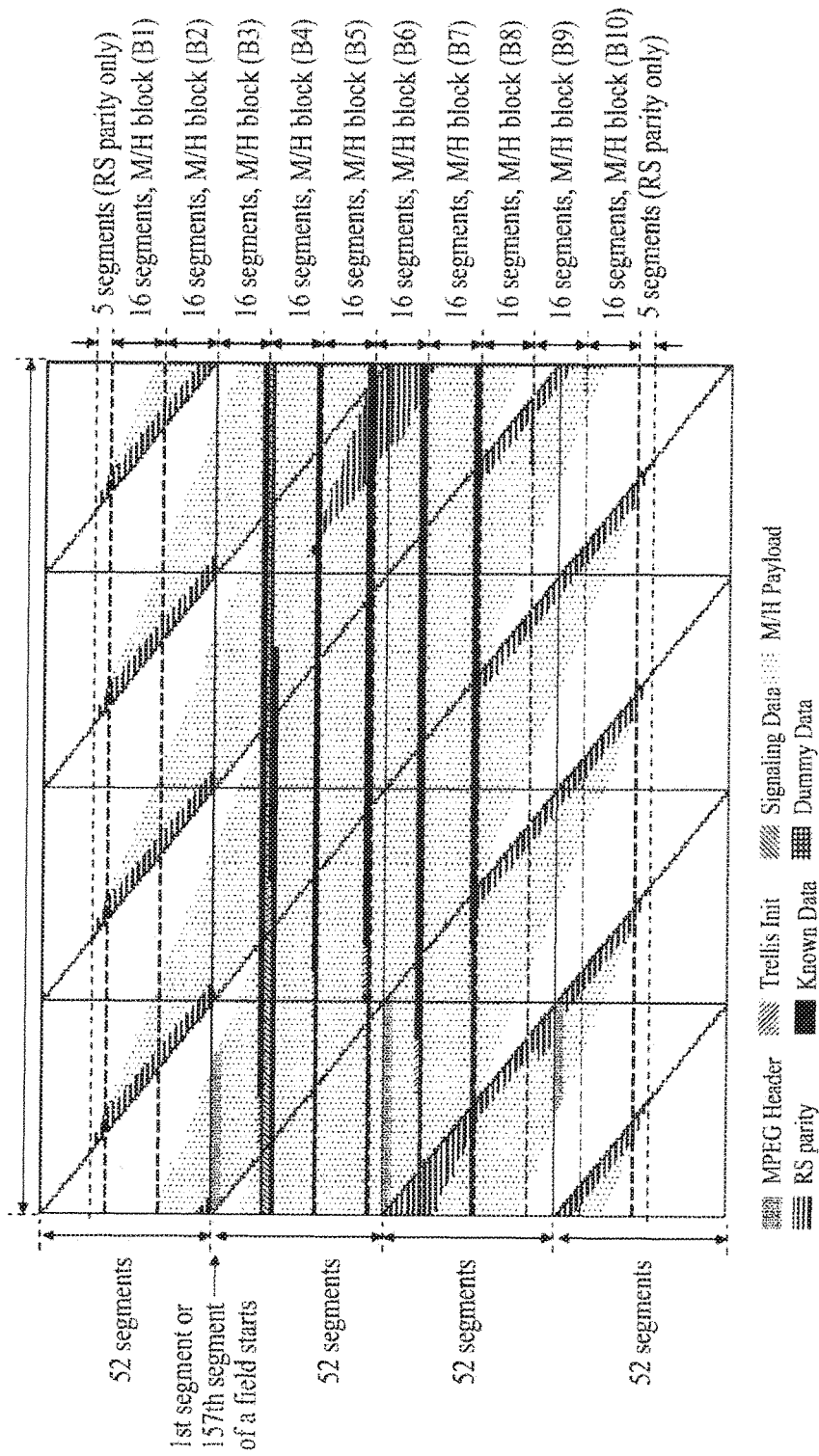
FIG. 2 illustrates an exemplary structure of a data group according to the present invention.

FIG. 2 illustrates an exemplary structure of a data group according to the present invention. FIG. 2 shows an example of dividing a data group according to the data structure of the present invention into 10 M/H blocks (i.e., M/H block 1 (B1) to M/H block 10 (B10)). In this example, each M/H block has the length of 16 segments. Referring to FIG. 2, only the RS parity data are allocated to portions of the 5 segments before the M/H block 1 (B1) and the 5 segments following the M/H block 10 (B10). The RS parity data are excluded in regions A to D of the data group. More specifically, when it is assumed that one data group is divided into regions A, B, C, and D, each M/H block may be included in any one of region A to region D depending upon the characteristic of each M/H block within the data group.

Herein, the data group is divided into a plurality of regions to be used for different purposes. More specifically, a region of the main service data having no interference or a very low interference level may be considered to have a more resistant (or stronger) receiving performance as compared to regions having higher interference levels. Additionally, when using a system inserting and transmitting known data in the data group, wherein the known data are known based upon an agreement between the transmitting system and the receiving system, and when consecutively long known data are to be periodically inserted in the mobile service data, the known data having a predetermined length may be periodically inserted in the region having no interference from the main service data (i.e., a region wherein the main service data are not mixed). However, due to interference from the main service data, it is difficult to periodically insert known data and also to insert consecutively long known data to a region having interference from the main service data.

In the data group, the data included in a RS frame will be referred to as "mobile service data" for simplicity. The RS frame data (or the data of the RS frame) will be described in more detail in a later process.

Referring to FIG. 2, M/H block 4 (B4) to M/H block 7 (B7) correspond to regions without interference of the main service data. M/H block 4 (B4) to M/H block 7 (B7) within the data group shown in FIG. 2 correspond to a region where no interference from the main service data occurs. In this example, a long known data sequence is inserted at both the beginning and end of each M/H block. In the description of the present invention, the region including M/H block 4 (B4) to M/H block 7 (B7) will be referred to as "region A (=B4+B5+B6+B7)". As described above, when the data group includes region A having a long known data sequence inserted at both the beginning and end of each M/H block, the receiving system is capable of performing equalization by using the channel information that can be obtained from the known data. Therefore, the strongest equalizing performance may be yielded (or obtained) from one of region A to region D.

In the example of the data group shown in FIG. 2, M/H block 3 (B3) and M/H block 8 (B8) correspond to a region having little interference from the main service data. Herein, a long known data sequence is inserted in only one side of each M/H block B3 and B8. More specifically, due to the interference from the main service data, a long known data sequence is inserted at the end of M/H block 3 (B3), and another long known data sequence is inserted at the beginning of M/H block 8 (B8). In the present invention, the region including M/H block 3 (B3) and M/H block 8 (B8) will be referred to as "region B (=B3+B8)". As described above, when the data group includes region B having a long known data sequence inserted at only one side (beginning or end) of each M/H block, the receiving system is capable of performing equalization by using the channel information that can be obtained from the known data. Therefore, a stronger equalizing performance as compared to region C/D may be yielded (or obtained).

Referring to FIG. 2, M/H block 2 (B2) and M/H block 9 (B9) correspond to a region having more interference from the main service data as compared to region B. A long known data sequence cannot be inserted in any side of M/H block 2 (B2) and M/H block 9 (B9). Herein, the region including M/H block 2 (B2) and M/H block 9 (B9) will be referred to as "region C (=B2+B9)". Finally, in the example shown in FIG. 2, M/H block 1 (B1) and M/H block 10 (B10) correspond to a region having more interference from the main service data as compared to region C. Similarly, a long known data sequence cannot be inserted in any side of M/H block 1 (B1) and M/H block 10 (B10). Herein, the region including M/H block 1 (B1) and M/H block 10 (B10) will be referred to as "region D (=B1+B10)". Since region C/D is spaced further apart from the known data sequence, when the channel environment undergoes frequent and abrupt changes, the receiving performance of region C/D may be deteriorated.

Additionally, the data group includes a signaling information area wherein signaling information is assigned (or allocated). In the present invention, the signaling information area may start from the $1^{St}$ segment of the $4^{th}$ M/H block (B4) to a portion of the $2^{nd}$ segment. According to an embodiment of the present invention, the signaling information area for inserting signaling information may start from the $1^{st}$ segment of the $4^{th}$ M/H block (B4) to a portion of the $2^{nd}$ segment. More specifically, 276(=207+69) bytes of the $4^{th}$ M/H block (B4) in each data group are assigned as the signaling information area. In other words, the signaling information area consists of 207 bytes of the $1^{st}$ segment and the first 69 bytes of the $2^{nd}$ segment of the $4^{th}$ M/H block (B4). The $1^{St}$ segment of the $4^{th}$ M/H block (B4) corresponds to the $17^{th}$ or $173^{rd}$ segment of a VSB field.

Herein, the signaling data transmitted through the signaling information area may be identified by two different types of channel data: a transmission parameter channel (TPC) data and a fast information channel (FIC) data.

Also, the TPC data includes parameters that are mostly used in a physical layer module. And, since the TPC data are transmitted without being interleaved, the TPC data may be accessed by slot unit in the receiving system. The FIC data are provided in order to enable the receiving system to perform fast service acquisition. Herein, the FIC data include cross layer information between a physical layer and an upper layer. The FIC data are interleaved in sub-frame units and then transmitted.

For example, when the data group includes 6 known data sequences, as shown in FIG. 2, the signaling information area is located between the first known data sequence and the second known data sequence. More specifically, the first known data sequence is inserted in the last 2 segments of the $3^{rd}$ M/H block (B3), and the second known data sequence in inserted in the $2^{nd}$ and $3^{rd}$ segments of the $4^{th}$ M/H block (B4). Furthermore, the $3^{rd}$ to $6^{th}$ known data sequences are respectively inserted in the last 2 segments of each of the $4^{th}$, $5^{th}$, $6^{th}$, and $7^{th}$ M/H blocks (B4, B5, B6, and B7). The $1^{st}$ and $3^{rd}$ to $6^{th}$ known data sequences are spaced apart by 16 segments.

Figure 3:
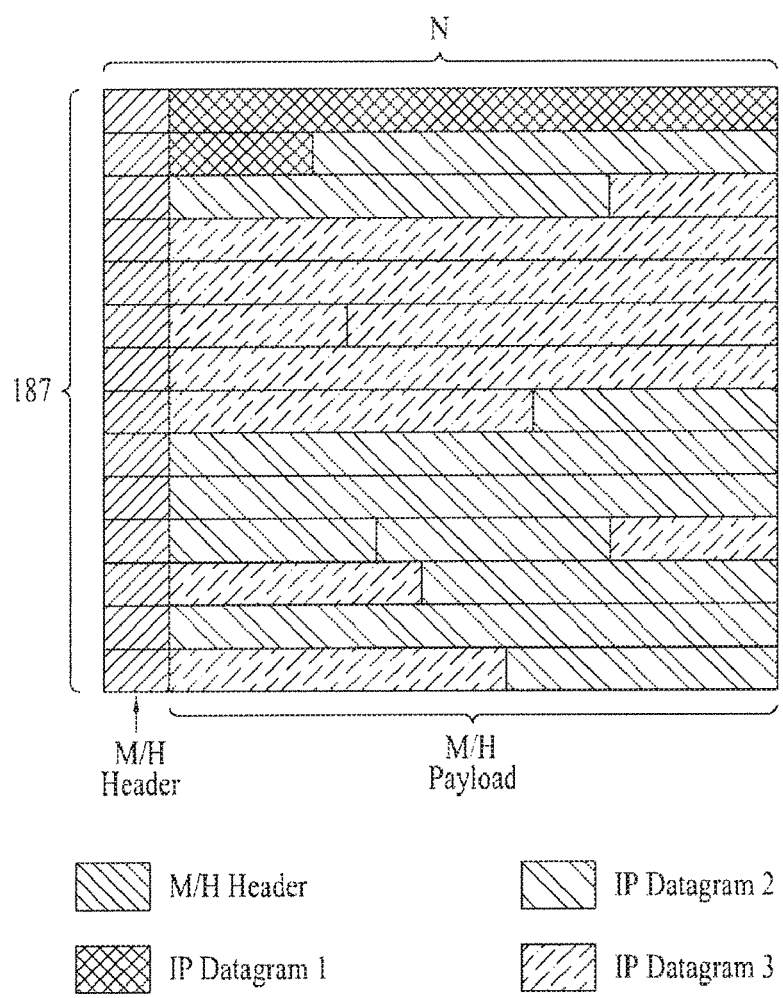
FIG. 3 illustrates an RS frame according to an embodiment of the present invention.

FIG. 3 illustrates an RS frame according to an embodiment of the present invention.

The RS frame is received for each M/H frame in a condition where the receiving system is switched to a time-slicing mode.

The RS frame according to an embodiment of the present invention is configured of multiple M/H transport packets (TPs). Each M/H TP consists of a 2-byte M/H header and a (N−2)-byte M/H payload. The M/H payload may include at least one of an IP datagram of mobile service data, an IP datagram of an SMT, and an IP datagram of an SGDD.

More specifically, one RS frame includes an IP datagram of each mobile service data set. Also, an IP datagram of an SMT section is included in each of the RS frames. According to an embodiment of the present invention, the IP datagram of the SMT or the IP datagram of a service signaling channel transmitting the SMT comprises a well-known IP destination address and a well-known destination UDP port number. And, the IP datagram is included in the RS frame so as to be received.

Furthermore, an IP datagram of the SGDD may be included in the RS frame. According to an embodiment of the present invention, the access information of the SGDD or the access information of the service guide announcement channel transmitting the SGDD is signaled to the SMT. The access information of the service guide announcement channel includes service guide bootstrap information.

Three types of IP datagrams (IP datagram 1, IP datagram 2, and IP datagram 3) are included in the RS frame shown in FIG. 3, one of the three IP datagrams is designated for the SMT. The remaining IP datagrams may correspond to IP datagrams of mobile service data or IP datagrams designated for the SGDD. In the transmitting system, RS-encoding is performed on the RS frame in a column direction, and CRC-encoding is performed on the RS frame in a row direction. Then, the processed RS frame is allocated to the corresponding regions within multiple data groups, thereby being transmitted. In the description of the present invention, all of the data included in the RS frame will be referred to as mobile service data for simplicity.

Data Transmission Structure

Figure 4:
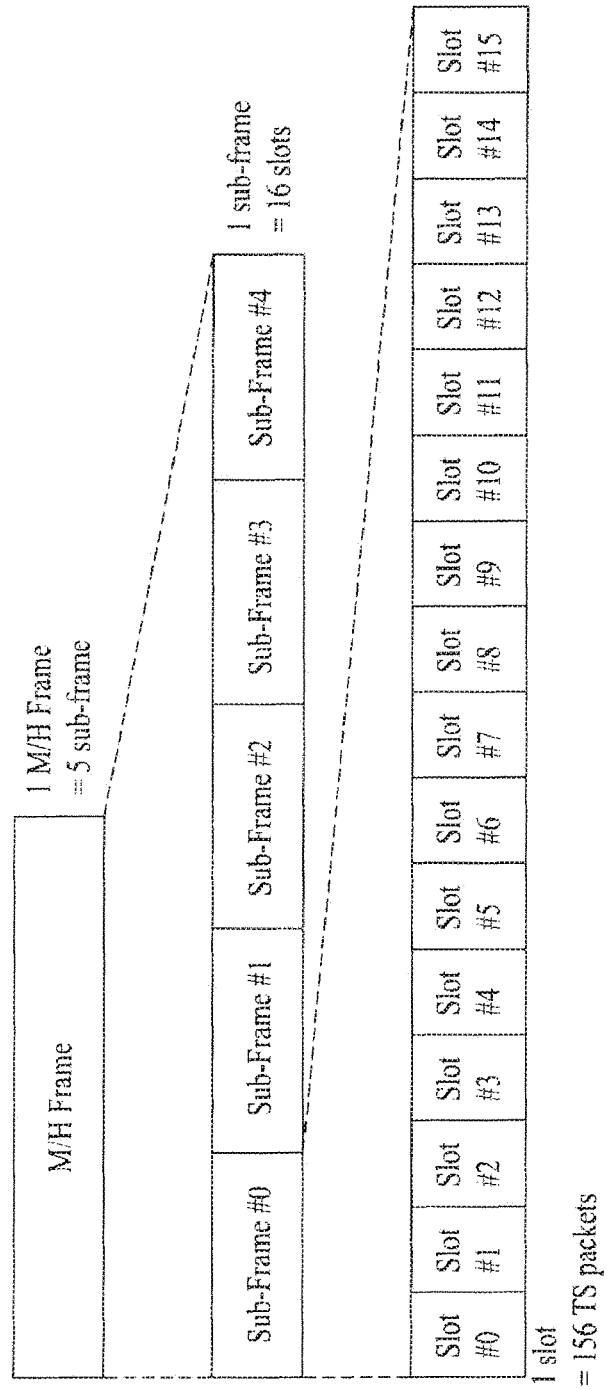
FIG. 4 illustrates an example of an M/H frame structure for transmitting and receiving mobile service data according to the present invention.

FIG. 4 illustrates a structure of an M/H frame for transmitting and receiving mobile service data according to the present invention. In the example shown in FIG. 4, one M/H frame consists of 5 sub-frames, wherein each sub-frame includes 16 slots. In this case, the M/H frame according to the present invention includes 5 sub-frames and 80 slots. Also, in a packet level, one slot is configured of 156 data packets (i.e., transport stream packets), and in a symbol level, one slot is configured of 156 data segments. Herein, the size of one slot corresponds to one half (½) of a VSB field. More specifically, since one 207-byte data packet has the same amount of data as a data segment, a data packet prior to being interleaved may also be used as a data segment. At this point, two VSB fields are grouped to form a VSB frame.

One VSB frame consists of 2 VSB fields (i.e., an odd field and an even field). Herein, each VSB field includes a field synchronization segment and 312 data segments. The slot corresponds to a basic time unit for multiplexing the mobile service data and the main service data.

Herein, one slot may either include the mobile service data or be configured only of the main service data. If the first 118 data packets within the slot correspond to a data group, the remaining 38 data packets become the main service data packets. In another example, when no data group exists in a slot, the corresponding slot is configured of 156 main service data packets.

Meanwhile, the data within one RS frame may be assigned either to all of regions A/B/C/D within the corresponding data group, or to at least one of regions A/B/C/D. In the embodiment of the present invention, the data within one RS frame may be assigned either to all of regions A/B/C/D, or to at least one of regions A/B and regions C/D. If the mobile service data are assigned to the latter case (i.e., one of regions A/B and regions C/D), the RS frame being assigned to regions A/B and the RS frame being assigned to regions C/D within the corresponding data group are different from one another.

According to the embodiment of the present invention, the RS frame being assigned to regions A/B within the corresponding data group will be referred to as a "primary RS frame", and the RS frame being assigned to regions C/D within the corresponding data group will be referred to as a "secondary RS frame", for simplicity. Also, the primary RS frame and the secondary RS frame form (or configure) one parade. More specifically, when the data within one RS frame are assigned either to all of regions A/B/C/D within the corresponding data group, one parade transmits one RS frame. Conversely, when the data within one RS frame are assigned either to at least one of regions A/B and regions C/D, one parade may transmit up to 2 RS frames. More specifically, the RS frame mode indicates whether a parade transmits one RS frame, or whether the parade transmits two RS frames. Such RS frame mode is transmitted as the TPC data. Table 1 below shows an example of the RS frame mode.

TABLE 1

| RS frame mode (2 bits) | Description |
| --- | --- |
| 00 | There is only one primary RS frame for all group regions |

TABLE 1-continued

| RS frame mode (2 bits) | Description |
| --- | --- |
| 01 | There are two separate RS frames. Primary RS frame for group regions A and B Secondary RS frame for group regions C and D |
| 10 | Reserved |
| 11 | Reserved |

Table 1 illustrates an example of allocating 2 bits in order to indicate the RS frame mode. For example, referring to Table 1, when the RS frame mode value is equal to '00', this indicates that one parade transmits one RS frame. And, when the RS frame mode value is equal to '01', this indicates that one parade transmits two RS frames, i.e., the primary RS frame and the secondary RS frame. More specifically, when the RS frame mode value is equal to '01', data of the primary RS frame for regions A/B are assigned and transmitted to regions A/B of the corresponding data group. Similarly, data of the secondary RS frame for regions C/D are assigned and transmitted to regions C/D of the corresponding data group.

As described in the assignment of data groups, the parades are also assigned to be spaced as far apart from one another as possible within the sub-frame. Thus, the system can be capable of responding promptly and effectively to any burst error that may occur within a sub-frame.

Furthermore, the method of assigning parades may be identically applied to all M/H frames or differently applied to each M/H frame. According to the embodiment of the present invention, the parades may be assigned differently for each M/H frame and identically for all sub-frames within an M/H frame. More specifically, the M/H frame structure may vary by M/H frame units. Thus, an ensemble rate may be adjusted on a more frequent and flexible basis.

That is, the concept of an M/H ensemble is applied in the embodiment of the present invention, thereby defining a collection (or group) of services. Each M/H ensemble carries the same QoS and is coded with the same FEC code. Also, each M/H ensemble has the same unique identifier (i.e., ensemble ID) and corresponds to consecutive RS frames.

Figure 5:
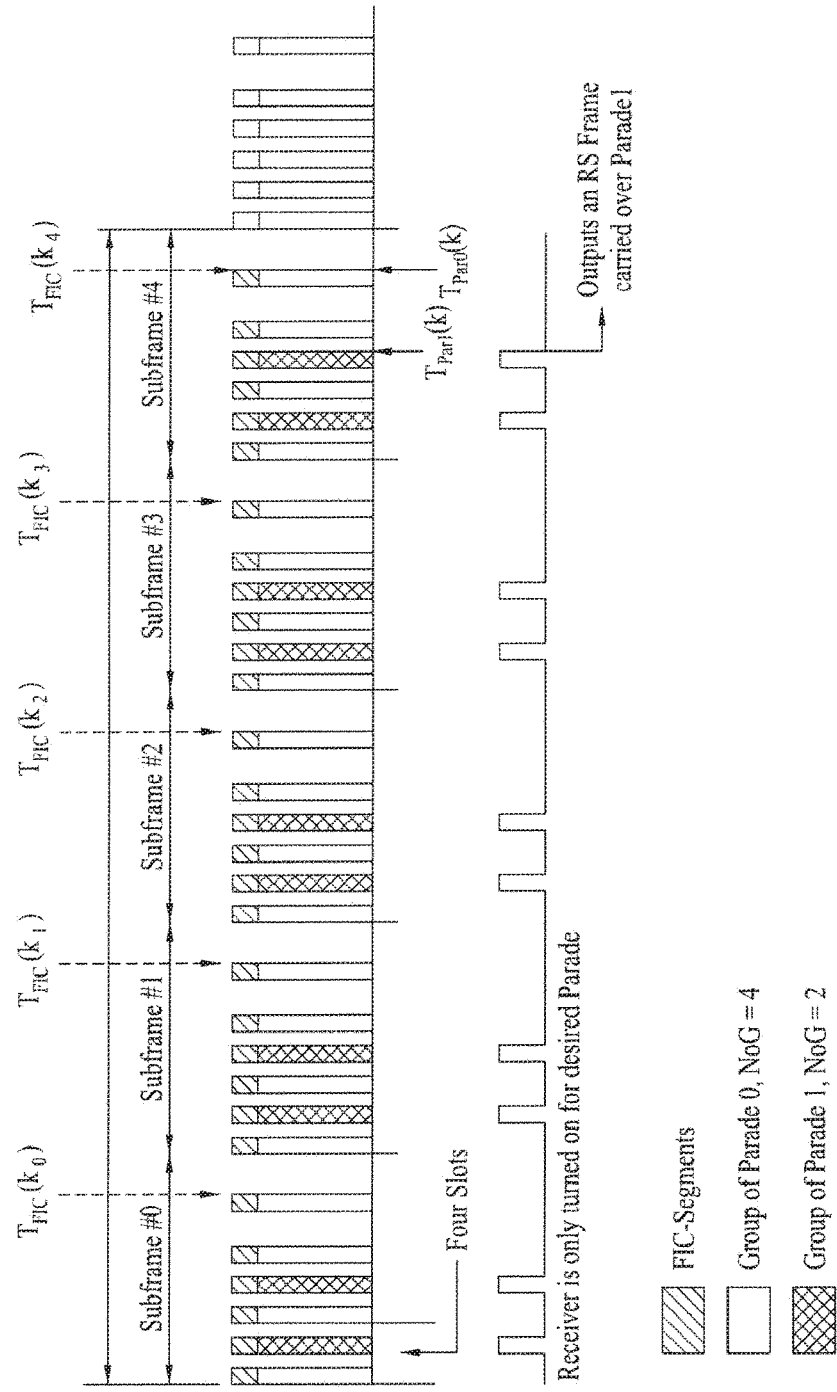
FIG. 5 illustrates a data transmission structure in a physical layer according to an embodiment of the present invention.

FIG. 5 illustrates a data transmission structure in a physical layer according to an embodiment of the present invention. More specifically, FIG. 5 shows an example of FIC data being included in each data group and transmitted. As described above, an M/H frame for approximately 0.968 seconds is divided into 5 sub-frames, wherein data groups corresponding to multiple ensembles exist in combination within each sub-frame. Also, the data groups corresponding to each ensemble are interleaved in M/H frame units, so as to configure an RS frame belonging to one ensemble. In FIG. 5, 2 ensembles (wherein NoG=4 and NoG=3) exist in each sub-frame. Furthermore, a predetermined portion (e.g., 37 bytes/data group) of each data group is used for the purpose of separately delivering encoded FIC data apart from the RS frame data channel. The FIC region assigned to each data group consists of one FIC segment. Herein, each of the FIC segments is interleaved in sub-frame units. For example, RS-encoding and SCCC encoding processes are applied to the RS frame data, and RS encoding and PCCC encoding processes are applied to the FIC data. Also, as well as the FIC data, the RS encoding and PCCC encoding processes are applied to the TPC data. More specifically, (187+P,187)-RS encoding process is applied to the RS frame data, (51,37)-RS encoding process is applied to the FIC data, and (18,10)-RS encoding process is applied to the TPC. Herein, P is the number of parity bytes.

Hierarchical Signaling Structure

Figure 6:
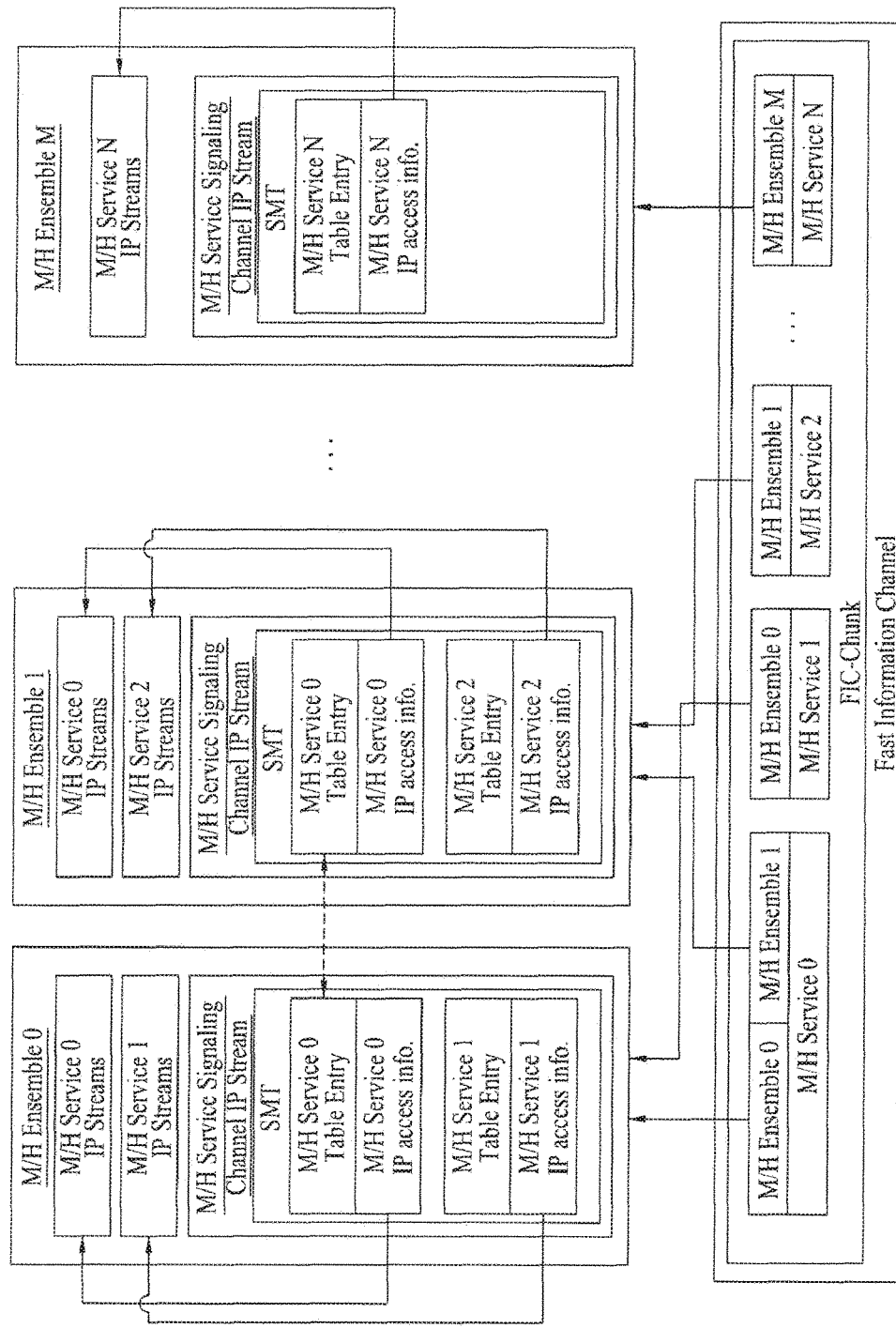
FIG. 6 illustrates a hierarchical signaling structure according to an embodiment of the present invention.

FIG. 6 illustrates a hierarchical signaling structure according to an embodiment of the present invention. As shown in FIG. 6, the mobile broadcasting technology according to the embodiment of the present invention adopts a signaling method using FIC and SMT (Service Map Table). In the description of the present invention, the signaling structure will be referred to as a hierarchical signaling structure. More specifically, FIG. 6 illustrates a hierarchical signaling structure that provides data required for service acquisition through an FIC chunk and a service map table (SMT), among IP-level mobile service signaling channels. As shown in FIG. 6, the FIC chunk uses its fast characteristic, so as to deliver a mapping relation between a service and an ensemble to the receiving system. More specifically, the FIC chunk quickly locates (or finds) an ensemble that can deliver a service requested by the receiving system, thereby providing the receiving system with signaling data that can enable the receiving system to swiftly receive RS frames of a respective ensemble.

Fast Information Channel (FIC)

The receiving system according to the present invention adopts the fast information channel (FIC) for a faster (or swifter) access to a service that is currently being broadcasted.

FIG. 7 illustrates a syntax structure of an FIC chunk that maps the relation between a mobile service and an ensemble through the FIC. Herein, the FIC chunk consists of an FIC chunk header and an FIC chunk payload.

FIG. 8 illustrates a syntax structure of an FIC chunk header according to an embodiment of the present invention.

Herein, the FIC chunk header signals a non-backward compatible major protocol version change in a corresponding FIC chunk and also signals a backward compatible minor protocol version change. Furthermore, the FIC chunk header also signals the length for an extension of an FIC chunk header, the length for an extension of an ensemble loop header, and the length for an extension of a mobile service loop that can be generated by a minor protocol version change.

According to an embodiment of the present invention, a receiver (or receiving system) that can adopt the corresponding minor protocol version change may process the corresponding extension field, whereas a legacy (or conventional) receiver that cannot adopt the corresponding minor protocol version change may skip the corresponding extension field by using each of the corresponding length information. For example, in case of a receiving system that can accept the corresponding minor protocol version change, the directions given in the corresponding extension field may be known. Furthermore, the receiving system may perform operations in accordance with the directions given in the corresponding extension field.

According to an embodiment of the present invention, a minor protocol version change in the FIC chunk is performed by inserting additional fields at the respective end portion of the FIC chunk header, the ensemble loop header, and the mobile service loop included in the previous minor protocol version FIC chunk. According to an embodiment of the present invention, in any other case, or when the length of the additional fields cannot be expressed (or indicated) by each extension length within the FIC chunk header, or when a specific field within the FIC chunk payload is missing (or cannot be found), or when the number of bits being assigned to the corresponding field or the definition of the corresponding field is changed (or altered), the major protocol version of the corresponding FIC chunk is updated.

Also, the FIC chunk header signals whether the data of a corresponding FIC chink payload carry mapping information between an ensemble and a mobile service within the current M/H frame, or whether the data of a corresponding FIC chink payload carry mapping information between an ensemble and a mobile service within the next M/H frame. Furthermore, the FIC chunk header also signals the number of transport stream IDs of a mobile service through which the current FIC chunk is being transmitted and the number of ensembles being transmitted through the corresponding mobile service.

Furthermore, the FIC chunk header according to the present invention may signal an identifier of the ensemble to which an electronic service guide (ESG) entry point (i.e., a service guide delivery descriptor (SGDD)) is transmitted. In this case, the receiving system may know (or identify) the ensemble having the corresponding SGDD included and received therein.

Accordingly, for this, the FIC chunk header may include an FIC_major_protocol_version field, an FIC_minor_protocol_version field, an FIC_chunk_header_extension_length field, an ensemble_loop_header_extension_length field, an M/H_service_loop_extension_length field, a current_next_indicator field, a transport_stream_id field, SG_version field, a num_ensembles field, and ESG_Entrypoint_location field.

The FIC_major_protocol_version field corresponds to a 2-bit unsigned integer field that represents the major version level of an FIC chunk syntax. A change in the major version level shall indicate a change in a non-backward-compatible level. When the FIC_major_protocol_version field is updated, legacy (or conventional) receivers, which can process the prior major protocol version of an FIC chunk protocol, shall avoid processing the FIC chunk.

The FIC_minor_protocol_version field corresponds to a 3-bit unsigned integer field that represents the minor version level of an FIC chunk syntax. When it is assumed that the major version level remains the same, a change in the minor version level shall indicate a change in a backward-compatible level. More specifically, when the FIC_minor_protocol_version field is updated, legacy (or conventional) receivers, which can process the same major version of the FIC chunk protocol, may process a portion of the FIC chunk.

The FIC_Chunk_header_extension_length field corresponds to a 3-bit unsigned integer field identifying the length of FIC chunk header extension bytes, which are generated by the minor protocol version update of the corresponding FIC chunk. Herein, the extension bytes are appended (or added) at the end of the corresponding FIC chunk header.

The ensemble_header_extension_length field corresponds to a 3-bit unsigned integer field identifying the length of the ensemble header extension bytes, which are generated by the minor protocol version update of the corresponding FIC chunk. Herein, the extension bytes are appended (or added) at the end of the corresponding ensemble loop header.

Also, the M/H_service_loop_extension_length field corresponds to a 4-bit unsigned integer field identifying the length of the ensemble header extension bytes, which are generated by the minor protocol version update of the M/H service loop. Herein, the extension bytes are appended (or added) at the end of the corresponding M/H service loop.

For example, it is assumed that the FIC chunk includes 2 ensembles (i.e., ensemble 0 and ensemble 1) more specifically, it is assumed that two mobile services are transmitted through ensemble 0, and one mobile service is transmitted through ensemble 1. At this point, when the minor protocol version of the FIC chunk is changed, and the FIC chunk header is expanded by 1 byte, the FIC_chunk_header_extension_length field is marked as '001'. In this case, a 1-byte expansion field (i.e., FIC_Chunk_header_extension_bytes field) is added at the end of the FIC chunk header. Also, the legacy receiver skips the 1-byte expansion field, which is added at the end of the FIC chunk header, without processing the corresponding expansion field.

Additionally, when the ensemble loop header within the FIC chunk is expanded by 2 bytes, the ensemble_loop_header_extension_length field is marked as '010'. In this case, a 2-byte expansion field (i.e., Ensemble_loop_header_extension_bytes field) is respectively added at the end of the ensemble 0 loop header and at the end of the ensemble 1 loop header. Also, the legacy receiver skips the 2-byte expansion fields, which are respectively added at the end of the ensemble 0 loop header and at the end of the ensemble 1 loop header, without processing the corresponding 2-byte expansion fields.

Furthermore, when the mobile service loop of the FIC chunk is expanded by 1 byte, the M/H_service_loop_extension_length field is marked as '001'. In this case, a 1-byte expansion field (i.e., M/H_service_loop_extension_bytes field) is respectively added at the end of 2 mobile service loops being transmitted through ensemble 0 loop and at the end of 1 mobile service loop being transmitted through the ensemble 1 loop. And, the legacy receiver skips the 1-byte expansion fields, which are respectively added at the end of 2 mobile service loops being transmitted through ensemble 0 loop and at the end of 1 mobile service loop being transmitted through the ensemble 1 loop, without processing the corresponding 1-byte expansion fields.

As described above, when the FIC_minor_protocol version field is changed, a legacy (or conventional) receiver (i.e., a receiver that cannot adopt the minor protocol version change in the corresponding FIC chunk) processes the fields apart from the extension field. Thereafter, the legacy receiver uses the FIC_chunk_header_extension_length field, the ensemble_loop_header_extension_length field, and the M/H_service_loop_extension_length field, so as to skip the corresponding expansion fields without processing the corresponding fields. When using a receiving system that can adopt the corresponding minor protocol version change of the FIC chunk, each length field is used to process even the corresponding expansion field.

The current_next_indicator field corresponds to a 1-bit indicator, which, when set to '1', indicates that the corresponding FIC chunk is currently applicable. Alternatively, when the current_next_indicator field is set to '0', the current_next_indicator field indicates that the corresponding FIC chunk will be applicable for the next M/H frame. Herein, when the current_next_indicator field is set to '0', the most recent version of the FIC chunk being transmitted with the current_next_indicator field set to '1' shall be currently applicable. More specifically, when the current_next_indicator field value is set to '1', this indicates that the corresponding FIC chunk transmits the signaling data of the current M/H frame. Further, when the current_next_indicator field value is set to '0', this indicates that the corresponding FIC chunk transmits the signaling data of the next M/H frame. When reconfiguration occurs, wherein the mapping information between the ensemble within the current M/H frame and the mobile service differs from the ensemble within the next M/H frame and the mobile service, the M/H frame prior to reconfiguration is referred to as the current M/H frame, and the M/H frame following reconfiguration is referred to as the next M/H frame.

The transport_stream_id field corresponds to a 16-bit unsigned integer number field, which serves as a label for identifying the corresponding M/H broadcast. The value of the corresponding transport_stream_id field shall be equal to the value of the transport_stream_id field included in the program association table (PAT) within the MPEG-2 transport stream of a main ATSC broadcast.

The SG_version field is a 5-bit field, which indicates version information of a service guide being transmitted through a physical channel. More specifically, the physical channel corresponds to a physical channel to which the corresponding FIC chunk is transmitted.

The num_ensembles field corresponds to an 8-bit unsigned integer field, which indicates the number of M/H ensembles carried through the corresponding physical transmission channel.

The ESG_EntryPoint_Location field is assigned with 8 bits. Herein, the ESG_EntryPoint_Location field indicates an identifier of an ensemble (ensemble_id) to which an ESG entry point (i.e., SGDD) is transmitted. Accordingly, the receiving system may know (or identify) the ensemble in which the corresponding SGDD (e.g., ESG entry point) is included and received.

FIG. 9 illustrates an exemplary syntax structure of an FIC chunk payload according to an embodiment of the present invention. For each ensemble corresponding to the num_ensembles field value within the FIC chunk header of FIG. 8, the FIC chunk payload includes configuration information of each ensemble and information on mobile services being transmitted through each ensemble. Furthermore, the FIC chunk payload includes indication information that can indicate whether or not a service guide entry point (i.e., SGDD) exists for each ensemble. At this point, by using the indication information, the receiving system may know (or identify) whether or not a table including service guide bootstrap information is included in the service signaling channel. Herein, the table may correspond to an SMT or to a GAT.

The FIC chunk payload consists of an ensemble loop and a mobile service loop below the ensemble loop. The FIC chunk payload enables the receiver to determine through which ensemble a requested (or desired) mobile service is being transmitted. (This process is performed via mapping between the ensemble_id field and the M/H_service_id field.) Thus, the receiver may receive RS frames belonging to the corresponding ensemble.

In order to do so, the ensemble loop of the FIC chunk payload may include an ensemble_id field, an SG_entry_point_indicator field, an SMT_version field, an and a num_M/H_services field, which are collectively repeated as many times as the num_ensembles field value. The mobile service loop may include an MH_service_id field, MH_service_type field, a multi_ensemble_service field, an M/H_service_status field, and an SP_indicator field, which are collectively repeated as many times as the num_M/H_services field.

The ensemble_id field corresponds to an 8-bit unsigned integer field, which indicates a unique identifier of the corresponding ensemble. For example, the ensemble_id field may be assigned with values within the range '0x00' to '0x7F'. The ensemble_id field group (or associate) the mobile services with the respective ensemble. Herein, it is preferable that the value of the ensemble_id field is derived from the parade_id field carried (or transmitted) through the TPC data. If the corresponding ensemble is transmitted through a primary RS frame, the most significant bit is set to '0', and the remaining least significant bits are used as the parade_id field value of the corresponding parade. Meanwhile, if the corresponding ensemble is transmitted through a secondary RS frame, the most significant bit is set to '0', and the remaining least significant bits are used as the parade_id field value of the corresponding parade.

The SG_entry_point_indicator field is a 1-bit field. The SG_entry_point_indicator field indicates whether or not a service guide entry point (i.e., SGDD) exists in the corresponding ensemble. For example, when the value of the SG_entry_point_indicator field is equal to '1', this may indicate that the SGDD is included in the corresponding ensemble. And, when the value of the SG_entry_point_indicator field is equal to '0', this may indicate that the SGDD is not included in the corresponding ensemble. At this point, when the value of the SG_entry_point_indicator field is equal to '1', this may indicate that access information of a service guide announcement channel (i.e., service guide bootstrap information) is signaled to a service signaling channel included in the corresponding ensemble.

Therefore, based upon the value of the SG_entry_point_indicator field, the receiving system may identify whether or not an SGDD is included in the corresponding ensemble. More specifically, based upon the value of the SG_entry_point_indicator field, the receiving system may determine whether or not a table including the service guide bootstrap information is included in the service signaling channel. Herein, the table may correspond to an SMT or to a GAT.

In this example of the present invention, an ESG_EntryPoint_Location field is included in the FIC chunk header, and an SG_entry_point_indicator field is included in the FIC chunk payload. At this point, the receiving system may refer to the two field values in order to determine the ensemble having the SGDD included therein. Alternatively, the receiving system may refer to only one of the two field values in order to determine the ensemble having the SGDD included therein. According to another embodiment of the present invention, only one of the two fields may be included. For example, the ESG_EntryPoint_Location field may be included in the FIC chunk header, whereas the SG_entry_point_indicator field may not be included in the FIC chunk payload, and vice versa.

The SMT_version field is a 5-bit field, which indicates version information of the SMT data within the corresponding ensemble.

The num_M/H_services field corresponds to an 8-bit unsigned integer field, which represents the number of M/H services carried through the corresponding M/H ensemble.

For example, when the minor protocol version within the FIC chunk header is changed, and when an extension field is added to the ensemble loop header, the corresponding extension field is added immediately after the num_M/H_services field. According to anther embodiment of the present invention, if the num_M/H_services field is included in the mobile service loop, the corresponding extension field that is to be added in the ensemble loop header is added immediately after the M/H_service_configuration_version field.

The M/H_service_id field of the mobile service loop corresponds to a 16-bit unsigned integer number, which identifies the corresponding M/H service. The value (or number) of the M/H_service_id field shall be unique within the mobile (M/H) broadcast. When an M/H service has components in multiple M/H ensembles, the set of IP streams corresponding to the service in each ensemble shall be treated as a separate service for signaling purposes, with the exception that the entries for the corresponding services in the FIC shall all have the same M/H_service_id field value. Thus, the same M/H_service_id field value may appear in more than one num_ensembles loop. And, accordingly, the M/H_service_id field shall represent the overall combined service, thereby maintaining the uniqueness of the M/H_service_id field value.

The MH_service_type field is a 5-bit field, which indicates the type of the corresponding mobile service.

The multi_ensemble_service field corresponds to a 2-bit enumerated field, which identifies whether or not the corresponding M/H service is carried through more than one M/H ensemble. Also, the multi_ensemble_service field identifies whether or not the M/H service can be rendered meaningfully with only a portion of the M/H service being carried through the corresponding M/H ensemble.

The M/H_service_status field corresponds to a 2-bit enumerated field, which identifies the status of the corresponding M/H service. For example, the most significant bit of the M/H_service_status field indicates whether the corresponding M/H service is active (when set to '1') or inactive (when set to '0'). Furthermore, the least significant bit indicates whether the corresponding M/H service is hidden (when set to '1') or not (when set to '0'). The SP_indicator field corresponds to a 1-bit field, which, when set to '1', indicates whether or not service protection is applied to at least one of the components required for providing a significant presentation of the corresponding M/H service.

For example, when the minor protocol version of the FIC chunk is change, and if an expansion field is added to the mobile service loop, the expansion field is added after the SP_indicator field.

Also, the FIC chunk payload may include an FIC_chunk_stuffing( ) field. Stuffing of the FIC_chunk_stuffing( ) field may exist in an FIC-Chunk, to keep the boundary of the FIC-Chunk to be aligned with the boundary of the last FIC-Segment among FIC segments belonging to the FIC chunk. The length of the stuffing is determined by how much space is left after parsing through the entire FIC-Chunk payload preceding the stuffing.

At this point, the transmitting system (not shown) according to the present invention divides the FIC chunk into multiple FIC segments, thereby outputting the divided FIC segments to the receiving system in FIC segment units. The size of each FIC segment unit is 37 bytes, and each FIC segment consists of a 2-byte FIC segment header and a 35-byte FIC segment payload. More specifically, an FIC chunk, which is configured of an FIC chunk header and an FIC chunk payload, is segmented by units of 35 bytes. Also, an FIC segment is configured by adding a 2-byte FIC segment header in front of each segmented 35-byte unit.

According to an embodiment of the present invention, the length of the FIC chunk payload is variable. Herein, the length of the FIC chunk varies depending upon the number of ensembles being transmitted through the corresponding physical transmission channel and the number of mobile services included in each ensemble.

Also, the FIC chunk payload may include stuffing data. In this case, the stuffing data are used for the boundary alignment of the FIC chunk and the last FIC-Segment, among FIC segments belonging to the FIC chunk, according to the embodiment of the present invention. Accordingly, by minimizing the length of the stuffing data, unnecessary wasting of FIC segments can be reduced.

At this point, the number of stuffing data bytes being inserted in the FIC chunk can be calculated by using Equation 1 below.

$$\text{The number of stuffing data bytes} = 35 - j \quad \text{Equation 1}$$

j=(5+the number of signaling data bytes being inserted in the FIC chunk payload) mod 35

For example, when the added total length of the 5-byte header within the FIC chunk and signaling data, which is to be inserted in the payload within the FIC chunk, is equal to 205 bytes, the payload of the FIC chunk may include 5 bytes of stuffing data because j is equal to 30 in Equation 1. Also, the length of the FIC chunk payload including the stuffing data is equal to 210 bytes. Thereafter, the FIC chunk is divided into 6 FIC segments, which are then transmitted. At this point, a segment number is sequentially assigned to each of the 6 FIC segments divided from the FIC chunk.

Furthermore, the present invention may transmit the FIC segments divided from a single FIC chunk to a single sub-frame, or may transmit the divided FIC segments to multiple sub-frames. If the FIC chunk is divided and transmitted to multiple sub-frames, signaling data, which are required even when the amount of data that are to be transmitted through the FIC chunk is larger than the amount of FIC segments being transmitted through a single sub-frame (this case corresponds to when multiple services having very low bit rates are being executed), may all be transmitted through the FIC chunk.

Herein, the FIC segment numbers represent FIC segment numbers within each FIC chunk, and not the FIC segment number within each sub-frame. Thus, the subordinate relation between the FIC chunk and the sub-frame can be eliminated, thereby reducing excessive waste of FIC segments.

Furthermore, the present invention may add a null FIC segment. Despite the repeated transmission of the FIC chunk, and when stuffing is required in the corresponding M/H frame, the null FIC segment is used for the purpose of processing the remaining FIC segments. For example, it is assumed that TNoG is equal to '3' and that the FIC chunk is divided into 2 FIC segments. Herein, when the FIC chunk is repeatedly transmitted through 5 sub-frames within a single M/H frame, only 2 FIC segments are transmitted through one of the 5 sub-frames (e.g., the sub-frame chronologically placed in the last order). In this case, one null FIC segment is assigned to the corresponding sub-frame, thereby being transmitted. More specifically, the null FIC segment is used for aligning the boundary of the FIC chunk and the boundary of the M/H frame. At this point, since the null FIC segment is not an FIC segment divided from the FIC chunk, an FIC segment number is not assigned to the null FIC segment.

In the present invention, when a single FIC chunk is divided into a plurality of FIC segments, and when the divided FIC segments are included in each data group of at least one sub-frame within the M/H frame, so as to be transmitted, the corresponding FIC segments are allocated in a reversed order starting from the last sub-frame within the corresponding M/H frame. According to an embodiment of the present invention, in case a null FIC segment exists, the null FIC segment is positioned in the sub-frame within the M/H frame, so that the corresponding null FIC segment can be transmitted as the last (or final) segment.

At this point, in order to enable the receiving system to discard the null FIC segment without having to process the corresponding null FIC segment, identification information that can identify (or distinguish) the null FIC segment is required.

According to an embodiment of the present invention, the present invention uses the FIC_type field within the header of the null FIC segment as the identification information for identifying the null FIC segment. In this embodiment, the value of the FIC_type field within the null FIC segment header is set to '11', so as to identify the corresponding null FIC segment. More specifically, when the FIC_type field value within the null FIC segment header is set to '11' and transmitted to the receiving system, the receiving system may discard the payload of the FIC segment having the FIC_type field value set to '11' without having to process the corresponding FIC segment payload. Herein, the value '11' is merely an exemplary value given to facilitate and simplify the understanding of the present invention. As long as a pre-arrangement between the receiving system and the transmitting system is established, any value that can identify the null FIC segment may be given to the FIC_type field. Therefore, the present invention will not be limited only to the example set presented herein. Furthermore, the identification information that can identify the null FIC segment may also be indicated by using another field within the FIC segment header.

FIG. 10 illustrates an exemplary syntax structure of an FIC segment header according to an embodiment of the present invention. Herein, the FIC segment header may include an FIC_type field, an error_indicator field, an FIC_segment_num field, and an FIC_last_segment_num field. Each field will now be described as follows.

The FIC_type field corresponds to a 2-bit field, which, when set to '00' indicates that the corresponding FIC segment is carrying a portion of an FIC chunk. Alternatively, when the FIC_type field is set to '11', the FIC_type field indicates that the corresponding FIC segment is a null FIC segment, which transmits stuffing data. Herein, the remaining values are reserved for future use.

The error_indicator field corresponds to a 1-bit field, which indicates whether or not an error has occurred in the corresponding FIC segment during transmission. Herein, the error_indicator field is set to '1', when an error has occurred. And, the error_indicator field is set to '0', when an error does not exist (or has not occurred). More specifically, during the process of configuring the FIC segment, when a non-recovered error exists, the error_indicator field is set to '1'. More specifically, the error_indicator field enables the receiving system to recognize the existence (or presence) of an error within the corresponding FIC segment.

The FIC_segment_num field corresponds to a 4-bit unsigned integer number field, which indicates a number of the corresponding FIC segment. For example, if the corresponding FIC segment is the first FIC segment of the FIC chunk, the value of the FIC_segment_num field shall be set to '0x0'. Also, if the corresponding FIC segment is the second FIC segment of the FIC chunk, the value of the FIC_segment_num field shall be set to '0x1'. More specifically, the FIC_segment_num field shall be incremented by one with each additional FIC segment in the FIC chunk. Herein, if the FIC chunk is divided into 4 FIC segments, the FIC_segment_num field value of the last FIC segment within the FIC chunk will be indicated as '0x3'.

The FIC_last_segment_num field corresponds to a 4-bit unsigned integer number field, which indicates the number of the last FIC segment (i.e., the FIC segment having the highest FIC_segment_num field value) within a complete FIC chunk.

In the conventional method, FIC segment numbers are sequentially assigned (or allocated) for each FIC segment within one sub-frame. Therefore, in this case, the last FIC segment number always matches with the TNoG (i.e., the last FIC segment number is always equal to the TNoG). However, when using the FIC number assignment method according to the present invention, the last FIC segment number may not always match with the TNoG. More specifically, the last FIC segment number may match with the TNoG, or the last FIC segment number may not match with the TNoG. The TNoG represents a total number of data groups that are allocated (or assigned) to a single sub-frame. For example, when the TNoG is equal to '6', and when the FIC chunk is divided into 8 FIC segments, the TNoG is equal to '6', and the last FIC segment number is '8'.

According to another embodiment of the present invention, the null FIC segment may be identified by using the value of the FIC_segment_num field within the FIC segment header. More specifically, since an FIC segment number is not assigned to the null FIC segment, the transmitting system allocates null data to the FIC_segment_num field value of the null FIC segment, and the receiving system may allow the FIC segment having null data assigned to the FIC_segment_num field value to be recognized as the null FIC segment. Herein, instead of the null data, data pre-arranged by the receiving system and the transmitting system may be assigned to the FIC_segment_num field value, instead of the null data.

As described above, the FIC chunk is divided into a plurality of FIC segments, thereby being transmitted through a single sub-frame or being transmitted through multiple sub-frames. Also, FIC segments divided from a single FIC chunk may be transmitted through a single sub-frame, or FIC segments divided from multiple single FIC chunks may be transmitted through a single sub-frame. At this point, the number assigned to each FIC segment corresponds to a number within the corresponding FIC chunk (i.e., the FIC_seg_number value), and not the number within the corresponding sub-frame. Also, the null FIC segment may be transmitted for aligning the boundary of the M/H frame and the boundary of the FIC chunk. At this point, an FIC segment number is not assigned to the null FIC segment.

As described above, one FIC chunk may be transmitted through multiple sub-frames, or multiple FIC chunks may be transmitted through a single sub-frame. However, according to the embodiment of the present invention, the FIC segments are interleaved and transmitted in sub-frame units.

Meanwhile, FIG. 11 illustrates an exemplary structure of a bit stream syntax of an SMT section providing access information of the SGDD, which is included in the RS frame and then transmitted. Herein, the SMT section is configured in an MPEG-2 private section format for simplicity. However, the SMT section data may be configured in any possible format.

The SMT may provide access information of mobile services within an ensemble including the SMT. Also, the SMT may provide information required for the rendering of mobile services. Furthermore, the SMT may include at least one or more descriptors. Herein, other additional (or supplementary) information may be described by the descriptor.

According to an embodiment of the present invention, when an SGDD is included in an ensemble including the SMT, thereby being received, access information of the SGDD may be provided by using a descriptor of the SMT. According to the embodiment of the present invention, the descriptor of the SMT corresponds to an ensemble level descriptor.

At this point, the service signaling channel that transmits the SMT may further include another signaling table (e.g., GAT) in addition to the SMT.

Herein, according to the embodiment of the present invention, IP datagrams of the service signaling channel have the same well-known destination IP address and the same well-known destination UDP port number. Therefore, the SMT included in the service signaling data is distinguished (or identified) by a table identifier. More specifically, the table identifier may correspond to a table_id existing in the corresponding table or in a header of the corresponding table section. And, when required, the table identifier may further refer to a table_id_extension field, so as to perform the identification process. Exemplary fields that can be transmitted through the SMT section will now be described in detail.

A table_id field is an 8-bit table identifier, which may be set up as an identifier for identifying the SMT. A section_syntax_indicator field corresponds to an indicator defining the section format of the SMT. For example, the section_syntax_indicator field shall be set to '0' to always indicate that this table is derived from the "short" form of the MPEG-2 private section table format may correspond to MPEG long-form syntax. A private_indicator field is a 1-bit field, which indicates whether or not the SMT follows (or is in accordance with) a private section.

A section_length field is a 12-bit field, which specifies the section length of the remaining SMT data bytes immediately following the section_length field. A table_id_extension field corresponds to a table-dependent 16-bit field. Herein, the table_id_extension field corresponds to a logical portion of the table_id field providing the scope for the remaining fields. The table_id_extension field includes a SMT_protocol_version field and an ensemble_id field. The SMT_protocol_version field corresponds to an 8-bit unsigned integer field. Herein, the SMT_protocol_version field indicates a protocol version for allowing the corresponding SMT to carry, in a future process, parameters that may be structure differently from those defined in the current protocol. Presently, the value of the SMT_protocol_version field shall be equal to zero (0). Non-zero values of the SMT_protocol_version field may be used by a future version of this standard to indicate structurally different tables.

An ensemble_id field corresponds to an 8-bit field. Herein, the ID values associated with the corresponding ensemble that can be assigned to the ensemble_id field may range from '0x00' and '0x3F'. It is preferable that the value of the ensemble_id field is derived from the TPC data of the parade_id field. When the corresponding ensemble is transmitted through a primary RS frame, the most significant bit (MSB) is set to '0', and the remaining 7 bits are used as the parade_id field value of the corresponding parade. Meanwhile, when the corresponding ensemble is transmitted through a primary RS frame, the most significant bit (MSB) is set to '1', and the remaining 7 bits are used as the parade_id field value of the corresponding parade.

A version_number field corresponds to a 5-bit field, which specifies the version number of the SMT. A current_next_indicator field corresponds to a 1-bit field indicating whether or not the SMT section is currently applicable. A section_number field is an 8-bit field specifying the number of the current SMT section. A last_section_number field corresponds to an 8-bit field that specifies the number of the last section configuring the corresponding SMT.

And, a num_MH_services field corresponds to an 8-bit field, which specifies the number of mobile services in the corresponding SMT section. Hereinafter, a number of 'for' loop statements equivalent to the number of mobile services corresponding to the num_MH_services field is performed so as to provide signaling information on multiple mobile services. More specifically, signaling information of the corresponding mobile service is indicated for each mobile service that is included in the SMT section. Herein, the following field information corresponding to each mobile service may be provided as described below.

An MH_service_id field corresponds to a 16-bit unsigned integer number, which can uniquely identify the corresponding mobile service within the scope of the corresponding SMT section. A Multi_ensemble_service field corresponds to a 2-bit field, which can identify whether or not the corresponding mobile service is being transmitted more than one ensemble.

An MH_service_status field corresponds to a 2-bit field, which can identify the status of the corresponding mobile service. Herein, the MSB indicates whether the corresponding mobile service is active ('1') or whether the corresponding mobile service is inactive ('0'). Also, the LSB indicates whether the corresponding mobile service is hidden ('1') or not hidden ('0').

An SP_indicator field corresponds to a 1-bit field, which specifies service protection status of the corresponding mobile service. If the SP_indicator field is set to '1', then service protection is applied to at least one of the components needed to provide a meaningful presentation of the corresponding service. A short_MH_service_name_length field corresponds to a 3-bit field, which indicates the length of a short service name described in a short_service_name field in byte-length units. The short_MH_service_name field indicates the short name of the corresponding mobile service. An MH_service_category field is a 6-bit field, which identifies the type category of the corresponding mobile service.

A num_components field corresponds to a 5-bit field, which specifies the number of IP stream components in the corresponding mobile service.

An IP_version_flag field corresponds to a 1-bit indicator, which when set to '0' indicates that a source_IP_address field, an MH_service_destination_IP_address field, and a component_destination_IP_address field correspond to IPv4 addresses. The value of '1' for the IP_version_flag field is reserved for any possible future indication that the source_IP_address field, the MH_service_destination_IP_address field, and the component_destination_IP_address field correspond to IPv6 addresses. However, the usage of IPv6 addressing is currently undefined.

A source_IP_address_flag corresponds to a 1-bit Boolean flag, which indicates, when set, that a source IP address value for the corresponding service exists (or is present) so as to indicate a source specific multicast. An MH_service_destination_IP_address_flag corresponds to a 1-bit, which indicates, when set, that the corresponding IP stream component is transmitted through an IP datagram having a destination IP address different from that of the MH_service_destination_IP_address field. Therefore, when the MH_service_destination_IP_address_flag is set, the receiving system may use the component_destination_IP_address as the destination_IP_address in order to access the corresponding IP stream component. Furthermore, the receiving system ignores (or disregards) the MH_service_destination_IP_address field within the num_MH_services loop.

The source_IP_address field corresponds to a 32-bit field or a 128-bit field. When the source_IP_address_flag is set to '1', the source_IP_address field is required to be interpreted (or analyzed). However, when the source_IP_address_flag is set to '0', the source_IP_address field is not required to be interpreted (or analyzed). When the source_IP_address_flag is set to '1', and when the IP_version_flag field is set to '0', the corresponding field indicates that the source_IP_address field indicates a 32-bit IPv4 address specifying the corresponding mobile service source. Alternatively, if the IP_version_flag field is set to '1', the source_IP_address field indicates a 32-bit IPv6 address specifying the corresponding mobile service source.

The MH_service_destination_IP_address field corresponds to a 32-bit field or a 128-bit field. When the MH_service_destination_IP_address_flag field is set to '1', the MH_service_destination_IP_address_flag is required to be interpreted (or analyzed). However, when the MH_service_destination_IP_address_flag is set to '0', the MH_service_destination_IP_address_flag is not required to be interpreted (or analyzed). Herein, if the MH_service_destination_IP_address_flag is set to '1', and if the IP_version_flag field is set to '0', the MH_service_destination_IP_address field indicates a 32-bit destination IPv4 address for the corresponding mobile service.

Alternatively, if the MH_service_destination_IP_address_flag is set to '1', and if the IP_version_flag field is set to '1', the MH_service_destination_IP_address field indicates a 64-bit destination IPv6 address for the corresponding mobile service. In case the corresponding MH_service_destination_IP_address field cannot be interpreted, the component_destination_IP_address field within the num_components loop shall be interpreted. And, in this case, the receiving system shall use the component_destination_IP_address in order to access the IP stream component.

Meanwhile, the SMT according to the embodiment of the present invention provides information on multiple components using the 'for' loop statement. Hereinafter, a number of 'for' loop statements (or component loops) equivalent to the number of components corresponding to the num_component field value is performed so as to provide access information on multiple components. More specifically, access information of each component included in the corresponding mobile service is provided. In this case, the following field information on each component may be provided as described below.

An essential_component_indicator field is a 1-bit indicator, which, when set to '1', indicates that the corresponding component is an essential component for the service. Otherwise, the essential_component_indicator field indicates that the corresponding component is an optional component. A component_destination_IP_address_flag field corresponds to a 1-bit Boolean flag. When the component_destination_IP_address_flag field is set to '1', this indicates that a component_destination_IP_address exists for the corresponding component. A port_num_count field corresponds to a 6-bit field, which indicates a UDP port number associated with the corresponding UDP/IP stream component. Herein, the destination UDP Port number value is increased by 1 starting from a destination_UDP_port_num field value. The destination_UDP_port_num field corresponds to a 16-bit field, which indicates a destination UDP port number for the corresponding IP stream component.

A component_destination_IP_address field corresponds to a 32-bit field or a 128-bit field. When the IP_version_flag field is set to '0', the component_destination_IP_address field indicates a 32-bit destination IPv4 address for the corresponding IP stream component. Furthermore, when the IP_version_flag field is set to '1', the component_destination_IP_address field indicates a 128-bit destination IPv6 address for the corresponding IP stream component. When this field is present, the destination address of the IP datagrams carrying the corresponding component of the M/H service shall match the address in the component_destination_IP_address field. Alternatively, when this field is not present, the destination address of the IP datagrams carrying the corresponding component shall match the address in the M/H_service_destination_IP_address field. The conditional use of the 128 bit-long address version of this field is to facilitate possible future usage of the IPv6, although the usage of the IPv6 is currently undefined.

A num_component_level_descriptors field corresponds to a 4-bit field, indicating a number of descriptors providing additional information on the component level. A number of component_level_descriptor( ) corresponding to the value of the num_component_level_descriptors field is included in the component loop, so as to provide additional (or supplemental) information on the corresponding component. A num_MH_service_level_descriptors field corresponds to a 4-bit field indicating a number of descriptors providing additional information of the corresponding mobile service level.

A number of service_level_descriptor( ) corresponding to the value of the num_MH_service_level_descriptors field is included in the mobile service loop, so as to provide additional (or supplemental) information on the mobile service. A num_ensemble_level_descriptors field corresponds to a 4-bit field, which indicates a number of descriptors providing additional information on ensemble levels. Furthermore, a number of ensemble_level_descriptor( ) corresponding to the value of the num_ensemble_level_descriptors field is included in the ensemble loop, so as to provide additional (or supplemental) information on the ensemble.

Meanwhile, when the FIC indicates that an ESG entry point (i.e., SGDD) is included in the ensemble corresponding to the ensemble identifier of the SMT, a SG_Access_Descriptor is included in the ensemble level descriptor of the SMT. For example, it is assumed that the FIC uses at least one of the ESG_EntryPoint_Location field and the SG_entry_point_indicator field, so as to indicate that an SGDD is included in the ensemble having an ensemble identifier A. In this case, when the ensemble_id field value of the SMT is equal to 'A', an SG_Access_Descriptor is included in the SMT, thereby being received. According to an embodiment of the present invention, the SG_Access_Descriptor provides access information of a service guide announcement channel transmitting the SGDD. The access information of the service guide announcement channel includes service guide bootstrap information. The service guide bootstrap information includes a transmission session identifier of a FLUTE session transmitting the service guide announcement channel.

FIG. 12 illustrates a structure of a bit stream syntax of a SG_Access_Descriptor( ) according to an embodiment of the present invention. Each field of the SG_Access_Descriptor( ) will now be described in detail. Referring to FIG. 12, a descriptor_tag field corresponds to an 8-bit descriptor identifier. Herein, the descriptor_tag field indicates an identifier identifying the SG_Access_Descriptor( ). A descriptor_length field corresponds to an 8-bit field. The descriptor_length field indicates the length of the remaining portion of the descriptor in byte units starting from the end of the descriptor_length field to the end of the SG_Access_Descriptor( ).

When a value of an IP_version_flag field is set to '1', this indicates that a destination_IP_address field corresponds to an IPv6 address. And, when the value of the IP_version_flag field is set to '0', this indicates that the destination_IP_address field corresponds to an IPv4 address. A address_count field corresponds to a 7-bit counter, which indicates the number of IP addresses above the destination_IP_address field that are being transmitted for the transport of mobile service data.

The destination_IP_address field corresponds to a 32-bit field or a 128-bit field, which represents a destination IP address of a FLUTE session transmitting the service guide announcement channel. When the IP_version_flag field is set to '0', the destination_IP_address field indicates a 32-bit destination IPv4 address for the corresponding service guide announcement channel. Alternatively, when the IP_version_flag field is set to '1', the destination_IP_address field indicates a 64-bit destination IPv6 address for the corresponding service guide announcement channel.

A destination_UDP_port_num field corresponds to a 16-bit field, which represents a destination UDP port number of a FLUTE session transmitting the service guide announcement channel. An announcement_channel_TSI field is a 16-bit field, which indicates a transmission session identifier for the FLUTE session, through which the service guide announcement channel is transmitted.

More specifically, the destination_IP_address field and the destination_UDP_port_num field are used to acquire an IP datagram of a service guide announcement channel transmitting the SGDD from the corresponding ensemble. Then, after removing the ALC/LCT header from the acquired IP datagram, the announcement_channel_TSI field is used to access the corresponding FLUTE session, thereby receiving the SGDD. Thereafter, the FLUTE session information of SGDUs may be acquired from the SGDD.

And, based upon the FLUTE session information, all FLUTE sessions are accessed so as to receive the SGDUs. Herein, one SGDU includes at least one or more fragments.

At this point, when the service guide announcement channel carries a well-known destination IP address and a well-known destination UDP port number, the destination_IP_address field and the destination_UDP_port_num field may be omitted.

Meanwhile, the access information of the SGDD shown in FIG. 12 may be provided in a table format. In this case, according to the embodiment of the present invention, the table including the SGDD access information is transmitted through the service signaling channel. Also, according to the present invention, the identification of the table including SGDD access information is performed by using a table identifier. The table identifier may correspond to a table_id field existing in the corresponding table or in the header of the corresponding table section. And, when required, further reference may be made to the table_id_extension field, so as to perform the identification process.

Figure 13:
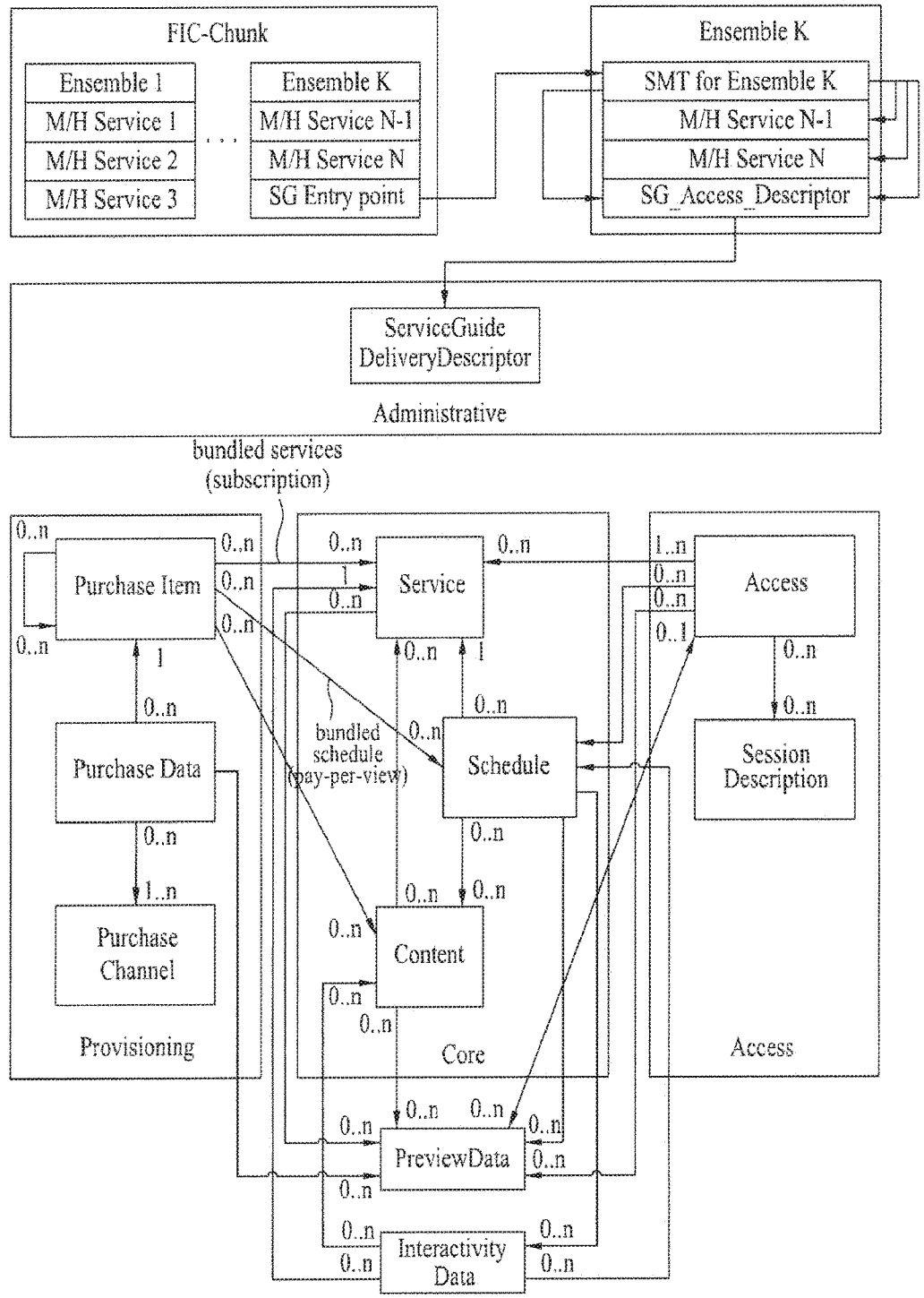
FIG. 13 illustrates the structure of a service guide and the co-relation between the FIC chunk and the SMT according to an embodiment of the present invention.

FIG. 13 illustrates the structure of a service guide that is to be used in the M/H system according to the present invention and the co-relation between the FIC chunk and the SMT. Each SG fragment is grouped in SGDU units so as to be transmitted through a FLUTE session. Herein, the SGDD includes access information corresponding to the FLUTE session transmitting each SGDU. The FIC chunk indicates the ensemble through which the SGDD is being transmitted. And, the SMT included in the ensemble transmitting the SGDD uses an SG access descriptor in order to notify (or indicate) an IP access information or a FLUTE session access information of the SGDD. Thus, the receiving system may be capable of efficiently accessing the ESG.

Referring to FIG. 13, the service guide includes an administrative group, a provisioning group, a core group, and an access group. Herein, the administrative group provides upper-level configuration information of the overall service guide. The provisioning group provides information on the subscription and purchase of services. The core group provides core information of the service guide, such as the service, the content, and the service schedule. And, finally, the access group provides access information for accessing a specific service or content.

More specifically, in FIG. 13, the administrative group corresponds to a group providing the basic information for the receiving system to receive a service guide. Herein, the administrative group includes the service guide delivery descriptor (SGDD). The SGDD indicates access information of a FLUTE session in which a service guide delivery unit (SGDU) including at least one or more fragments is located. Herein, a fragment corresponds to a minimum unit configuring the service guide. The SGDD also indicates an entry point for receiving grouping information on the SGDU and a notification message.

The provisioning group corresponds to a group providing information on the fees charged for receiving services. Herein, the provisioning group includes a purchase item fragment, a purchase data fragment, and a purchase channel fragment. The core group corresponds to a group providing information on the service itself. Herein, the core group includes a service fragment, a schedule fragment, and a content fragment. The access group includes an access fragment and a session description fragment. In addition to the above-described groups, the service guide may also include a previewData fragment and an interactiveData fragment. The arrows shown in FIG. 13 indicate the reference relation between each fragment. According to the example shown in FIG. 13, the schedule fragment, the content fragment, the purchase item fragment, and the access fragment may refer to the service fragment. And, the schedule fragment may refer the service fragment and the content fragment. The numbers shown above each arrow in FIG. 13 respectively indicate the available number of lower-level unit information. Also, these numbers indicate the available number of fragments.

The essential fragments among the above-mentioned fragments will now be described in detail.

The service fragment includes information on a service provided to a user (e.g., information on a service such as a conventional television channel).

The content fragment includes metadata on the corresponding content. For example, a content type, such as A/V data, text data, image data, may be included in the content fragment.

The schedule fragment includes schedule information on a single content within the provided service. For example, a broadcast time of the corresponding content may correspond to the schedule information.

The purchase item fragment includes item information associated with purchasing.

The purchase data fragment includes information associated with the purchase of a service, which may be purchased by the user. The purchase channel fragment indicates an interface used by the user or a terminal in order to communicate with a purchase system. The purchase channel fragment includes one of a parameter associated with the purchase system and information on managing a purchase channel.

The access fragment includes information associated with accessing a service or content.

Detailed element value and property value for each fragment of the service guide have not been included in the description of the present invention for simplicity. Nevertheless, such detailed element value and property value shall not limit the present invention. In providing service guide for mobile broadcast services, the present invention may apply all detailed element values and property values that are defined as required.

Figure 14:
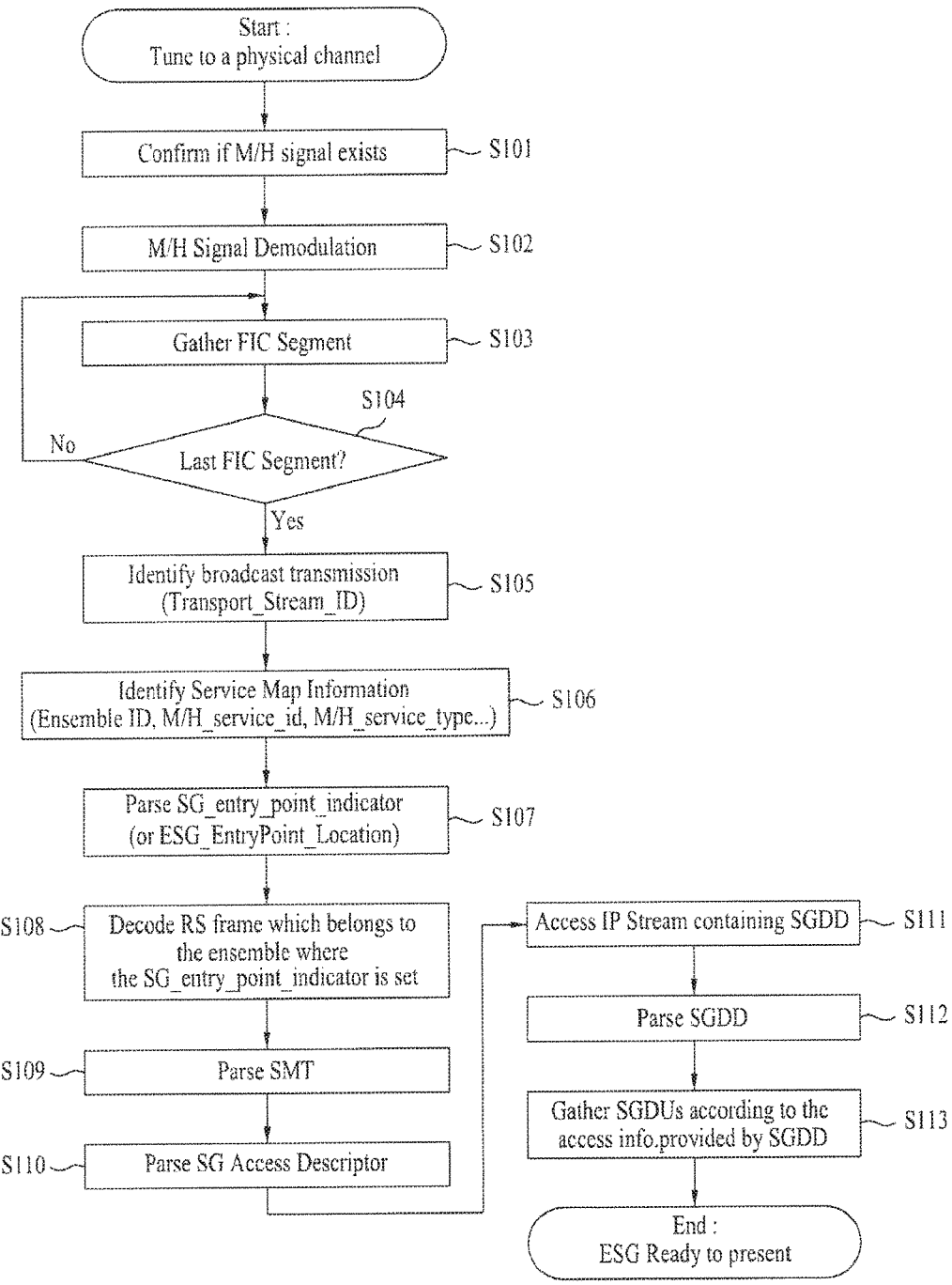
FIG. 14 illustrates a flow chart showing a method of receiving a service guide by using an FIC chunk and the SMT according to an embodiment of the present invention.

FIG. 14 illustrates a flow chart showing a method of receiving a service guide by using an FIC chunk and the SMT according to an embodiment of the present invention. Referring to FIG. 14, when the tuner tunes to a physical transport channel including a user-selected mobile service, the system verifies a mobile broadcast signal transmitting the user-selected mobile service from the tuned physical transport channel (S101). And, the verified mobile broadcast signal is demodulated (S102). Thereafter, FIC segments are acquired from the demodulated mobile broadcast signal, thereby recovering the FIC chunk (S103 and S104).

More specifically, the system finds out the sub-frame transmitting the demodulated mobile broadcast signal and slots allocated to the sub-frame. Subsequently, data groups being received through the slots of the found sub-frame are gathered. Then, PCCC-decoding is performed on the FIC data being received to each signaling information region of the gathered data groups. Then, after deinterleaving the PCCC-decoded FIC data in sub-frame units, RS-decoding is performed on the processed data as an inverse process of the transmitting system. Accordingly, the FIC segments are recovered for each sub-frame. This process is performed on one or more sub-frames. And, an FIC chunk is recovered from the FIC segment payloads based upon the FIC_type field, the FIC_segment_num field, and the FIC_last_segment_num field within each header of the FIC segments, which are recovered from one or more sub-frames.

According to an embodiment of the present invention, the recovered FIC chunk is configured of an FIC chunk header of FIG. 8 and an FIC chunk payload of FIG. 9.

A transport stream ID of a mobile broadcast carrying the FIC chunk is identified from the transport_stream_id field of the recovered FIC chunk header (S105). And, mapping information between an ensemble and a mobile service is configured by using the information included in the recovered FIC chunk (S106). The mapping information between the ensemble and the mobile service may include an ensemble identifier, a service identifier included in the ensemble identified by the ensemble identifier, and service type information. Thereafter, the ensemble in which the SGDD is included and received is verified from the recovered FIC chunk (S107).

In the present invention, reference may be made to both the ESG_EntryPoint_Location field value of the FIC chunk header and the SG_entry_point_indicator field value of the FIC chunk payload, so as to verify the ensemble in which the SGDD is included. Alternatively, only one of the two field values may be referred to, so as to verify the ensemble in which the SGDD is included. When the ensemble including the SGDD is identified in step 107, the receiving system is shifted to a time-slicing mode for receiving the corresponding ensemble, so as to receive RS frames belonging to the identified ensemble for each M/H frame (S108). According to an embodiment of the present invention, the receiving system receives RS frames belonging to the ensemble having the value of the SG_entry_point_indicator field within the FIC chunk payload set to '1'.

Then, the SMT is acquired from the received RS frame (S109). According to an embodiment of the present invention, the SMT is included in a service signaling channel having a well-known IP address and a well-known UDP port number, thereby being received. More specifically, the SMT is acquired by using a table identifier from the IP datagram of the service signaling channel having the well-known IP address and a well-known UDP port number. Among the descriptors included in the acquired SMT, the system processes the SG access descriptor, so as to acquire IP access information of an ESG entry point (i.e., SGDD) (S110). According to an embodiment of the present invention, the SG access descriptor includes a destination IP address, a destination UDP port number, and a TSI of the service guide announcement channel. Accordingly, by using the destination IP address and the destination UDP port number, the IP datagram of the service guide signaling channel transmitting the SGDD may be acquired from the corresponding RS frame (S111).

After removing the ALC/LCT header from the acquired IP datagram, the system accesses to the corresponding FLUTE session by using the announcement_channel_TSI field, thereby so as to receive the SGDD (S112). Then, after acquiring access information of the SGDUs from the received SGDD, the system accesses each FLUTE session based upon the acquired access information, so as to gather the SGDUs (S113). The SGDU includes one or more fragments. Then, SG data are extracted from the fragments included in the gathered SGDUs, thereby being stored. Thereafter, when requested by a user in a later process, the receiver displays SG information based upon the stored SG data.

According to the embodiment of the present invention, step 103 is performed by the signaling decoder, step 104 to step 107 are performed by the FIC handler or the physical adaptation control signal handler, and step 108 is performed by the RS frame decoder and the RS frame handler. Furthermore, according to the embodiment of the present invention, step 109 and step 110 are performed by the SI handler or the physical adaptation control signal handler, step 111 is performed by the IP network stack, and step 112 and step 113 are performed by the file handler and the ESG handler or the physical adaptation control signal handler.

Receiving System

Figure 15:
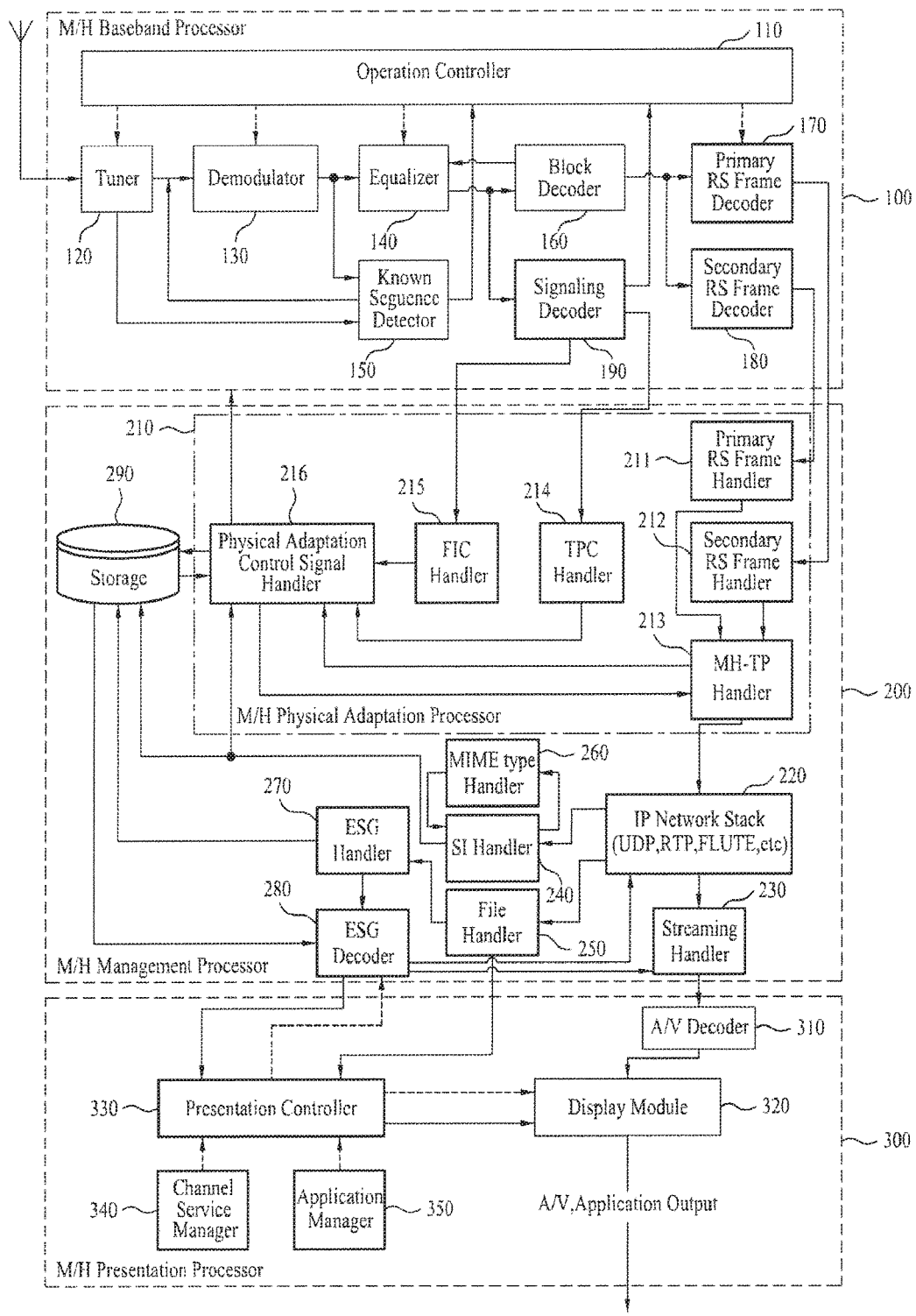
FIG. 15 illustrates a block diagram showing a general structure of a receiving system according to an embodiment of the present invention.

FIG. 15 illustrates a block diagram showing a general structure of a receiving system according to an embodiment of the present invention. The receiving system according to the present invention includes a baseband processor 100, a management processor 200, and a presentation processor 300.

The baseband processor 100 includes an operation controller 110, a tuner 120, a demodulator 130, an equalizer 140, a known sequence detector (or known data detector) 150, a block decoder (or mobile handheld block decoder) 160, a primary Reed-Solomon (RS) frame decoder 170, a secondary RS frame decoder 180, and a signaling decoder 190.

The operation controller 110 controls the operation of each block included in the baseband processor 100.

By tuning the receiving system to a specific physical channel frequency, the tuner 120 enables the receiving system to receive main service data, which correspond to broadcast signals for fixed-type broadcast receiving systems, and mobile service data, which correspond to broadcast signals for mobile broadcast receiving systems. At this point, the tuned frequency of the specific physical channel is down-converted to an intermediate frequency (IF) signal, thereby being outputted to the demodulator 130 and the known sequence detector 140.

The passband digital IF signal, which is outputted from the tuner 120, may include only the main service data, or include only the mobile service data, or include a combination of the main service data and the mobile service data. The mobile service data may correspond to RS frame data. Alternatively, the mobile service data may correspond to data required for mobile services within a data group.

The demodulator 130 performs self-gain control, carrier recovery, and timing recovery processes on the passband digital IF signal inputted from the tuner 120, thereby translating the IF signal to a baseband signal. Then, the demodulator 130 outputs the baseband signal to the equalizer 140 and the known sequence detector 150. The demodulator 130 uses the known data symbol sequence inputted from the known sequence detector 150 during the timing and/or carrier recovery, thereby enhancing the demodulating performance.

The equalizer 140 compensates channel-associated distortion included in the signal demodulated by the demodulator 130. Then, the equalizer 140 outputs the distortion-compensated signal to the block decoder 160. By using a known data symbol sequence inputted from the known sequence detector 150, the equalizer 140 may enhance the equalizing performance. Furthermore, the equalizer 140 may receive feed-back on the decoding result from the block decoder 160, thereby enhancing the equalizing performance.

The known sequence detector 150 detects known data place (or position) inserted by the transmitting system from the input/output data (i.e., data prior to being demodulated or data being processed with partial demodulation). Then, the known sequence detector 150 outputs the detected known data position information and known data sequence generated from the detected position information to the demodulator 130 and the equalizer 140. Additionally, in order to allow the block decoder 160 to identify the mobile service data that have been processed with additional encoding by the transmitting system and the main service data that have not been processed with any additional encoding, the known sequence detector 150 outputs such corresponding information to the block decoder 160.

If the data channel-equalized by the equalizer 140 and inputted to the block decoder 160 correspond to data processed with both block-encoding and trellis-encoding using serial concatenated convolution code (SCCC) by the transmitting system (i.e., data within the RS frame), the block decoder 160 may perform trellis-decoding and block-decoding as inverse processes of the transmitting system. On the other hand, if the data channel-equalized by the equalizer 140 and inputted to the block decoder 160 correspond to data processed only with trellis-encoding and not block-encoding by the transmitting system (i.e., main service data), the block decoder 160 may perform only trellis-decoding.

The signaling decoder 190 decoded signaling data that have been channel-equalized and inputted from the equalizer 140. It is assumed that the signaling data (i.e., signaling information) inputted to the signaling decoder 190 correspond to data processed with both block-encoding and trellis-encoding by the transmitting system. Examples of such signaling data may include transmission parameter channel (TPC) data and fast information channel (FIC) data. For example, among the data that are being inputted, the signaling decoder 190 performs regressive turbo decoding of a parallel concatenated convolution code (PCCC) method on data corresponding to the signaling information region. Subsequently, the signaling decoder 190 separates FIC data and TPC data from the regressive-turbo-decoded signaling data. Additionally, the signaling decoder 190 performs RS-decoding as inverse processes of the transmitting system on the separated TPC data, thereby outputting the processed data to the TPC handler 214. Also, the signaling decoder 190 performs deinterleaving in sub-frame units on the separated FIC data, so as to perform RS-decoding as inverse processes of the transmitting system on the deinterleaved FIC data, thereby outputting the processed data to the FIC handler 215. The FIC data being deinterleaved and RS-decoded from the signaling decoder 190 and outputted to the FIC handler 215 are transmitted in units of FIC segments.

Meanwhile, according to the present invention, the transmitting system uses RS frames by encoding units. Herein, the RS frame may be divided into a primary RS frame and a secondary RS frame. However, according to the embodiment of the present invention, the primary RS frame and the secondary RS frame will be divided based upon the level of importance of the corresponding data.

The primary RS frame decoder 170 receives the data outputted from the block decoder 160. At this point, according to the embodiment of the present invention, the primary RS frame decoder 170 receives the data of the primary RS frame that have been Reed-Solomon (RS)-encoded and/or cyclic redundancy check (CRC)-encoded from the block decoder 160. The primary RS frame decoder 170 performs inverse processes of an RS frame encoder (not shown) included in the transmitting system, thereby correcting errors existing within the primary RS frame. More specifically, the primary RS frame decoder 170 forms a primary RS frame by grouping a plurality of data groups and, then, correct errors in primary RS frame units.

Additionally, the secondary RS frame decoder 180 receives the data outputted from the block decoder 160. At this point, according to the embodiment of the present invention, the secondary RS frame decoder 180 receives the data of the secondary RS frame that have been RS-encoded and/or CRC-encoded from the block decoder 160. The secondary RS frame decoder 180 performs inverse processes of an RS frame encoder (not shown) included in the transmitting system, thereby correcting errors existing within the secondary RS frame. More specifically, the secondary RS frame decoder 180 forms a secondary RS frame by grouping a plurality of data groups and, then, correct errors in secondary RS frame units.

Meanwhile, the management processor 200 according to an embodiment of the present invention includes an MH physical adaptation processor 210, an IP network stack 220, a streaming handler 230, a system information (SI) handler 240, a file handler 250, a multi-purpose internet main extensions (MIME) type handler 260, and an electronic service guide (ESG) handler 270, and an ESG decoder 280, and a storage unit 290.

The MH physical adaptation processor 210 includes a primary RS frame handler 211, a secondary RS frame handler 212, an MH transport packet (TP) handler 213, a TPC handler 214, an FIC handler 215, and a physical adaptation control signal handler 216.

The TPC handler 214 extracts signaling information included in the TPC data outputted from the signaling decoder 190, thereby enabling the extracted signaling information to output to the physical adaptation control signal handler 216.

The TPC data may include a sub-frame number, a slot number, a parade identifier (parade id), a starting group number (SGN), a number of groups (NoG), a parade repetition cycle (PRC), an RS frame mode, an RS code mode, an SCCC block mode, an SCCC outer code mode, an FIC version, a parade continuity counter (PCC), a TNoG, and a TPC protocol version, and so on.

The sub-frame number information indicates the number of a current sub-frame within a corresponding M/H frame and is transmitted for M/H frame synchronization.

The slot number information is the current Slot number within the Sub-Frame.

The parade identifier information identifies the Parade to which this Group belongs. Each Parade in an M/H transmission shall have a unique Parade identifier. In this case, communication of the Parade identifier between the physical layer and the management layer shall be performed by means of an ensemble identifier formed by adding one bit to the left of the Parade identifier. If the Ensemble identifier is for the primary ensemble delivered through this Parade, the added MSB shall be '0'. Otherwise, if it is for the secondary ensemble, the added MSB shall be '1'.

The starting Group number (SGN) information shall be the first Slot number for a Parade to which this Group belongs (after the Slot numbers for all preceding Parades have been calculated). The number of Groups (NoG) information shall be the number of Groups in a Sub-Frame assigned to the Parade to which this Group belongs.

The Parade repetition cycle (PRC) information shall be the cycle time over which the Parade is transmitted, specified in units of M/H Frames. The RS frame mode information indicates whether a single parade carries a single RS frame or two RS frames. The RS code mode information indicates an RS code mode for a RS frame. The SCCC block mode information indicates how M/H blocks within a data group are allocated to SCCC block. The SCCC outer code mode information indicates an SCCC outer mode code for a data group. The FIC version information indicates a version of FIC data. The Parade continuity counter information is incremented to 0~15 and is incremented by 1 for each (PRC+1) M/H frame. For instance, if PRC=011, the Parade_continuity_counter field is incremented each fourth M/H frame.

The TNoG information indicates the total number of data groups to be transmitted during a Sub-Frame. The TPC protocol version information represents a version of the corresponding TPC syntax structure.

However, the information included in the TPC data presented herein is merely exemplary. And, since the adding or deleting of information included in the TPC may be easily adjusted and modified by one skilled in the art, the present invention will, therefore, not be limited to the examples set forth herein.

The FIC handler 215 receives FIC data from the signaling decoder 190, so as to extract signaling information for service acquisition (i.e., mapping information between an ensemble and a mobile service).

The primary RS frame handler 211 identifies primary RS frames received from the primary RS frame decoder 170 of the baseband processor 100 for each row unit, so as to configure an MH TP. Thereafter, the primary RS frame handler 211 outputs the configured MH TP to the MH TP handler 213.

The secondary RS frame handler 212 identifies secondary RS frames received from the secondary RS frame decoder 180 of the baseband processor 100 for each row unit, so as to configure an MH TP. Thereafter, the secondary RS frame handler 212 outputs the configured MH TP to the MH TP handler 213.

The MH transport packet (TP) handler 213 extracts a header from each MH TP received from the primary RS frame handler 211 and the secondary RS frame handler 212, thereby determining the data included in the corresponding MH TP. Then, when the determined data correspond to SI data (i.e., SI data that are not encapsulated to IP datagrams), the corresponding data are outputted to the physical adaptation control signal handler 216. Alternatively, when the determined data correspond to an IP datagram, the corresponding data are outputted to the IP network stack 220.

The IP network stack 220 processes broadcast data that are being transmitted in the form of IP datagrams. More specifically, the IP network stack 220 processes data that are inputted via user datagram protocol (UDP), real-time transport protocol (RTP), real-time transport control protocol (RTCP), asynchronous layered coding/layered coding transport (ALC/LCT), file delivery over unidirectional transport (FLUTE), and so on. Herein, when the processed data correspond to streaming data, the corresponding data are outputted to the streaming handler 230. And, when the processed data correspond to data in a file format, the corresponding data are outputted to the file handler 250. Finally, when the processed data correspond to SI-associated data, the corresponding data are outputted to the SI handler 240. For example, the SMT acquired from the IP datagram of a service signaling channel is outputted to the SI handler 240.

The SI handler 240 receives and processes SI data having the form of IP datagrams, which are inputted to the IP network stack 220.

When the inputted data associated with SI correspond to MIME-type data, the inputted data are outputted to the MIME-type handler 260.

The MIME-type handler 260 receives the MIME-type SI data outputted from the SI handler 240 and processes the received MIME-type SI data.

The file handler 250 receives data from the IP network stack 220 in an object format in accordance with the ALC/LCT and FLUTE structures. The file handler 250 groups the received data to create a file format. Herein, when the corresponding file includes ESG, the file is outputted to the ESG handler 270. On the other hand, when the corresponding file includes data for other file-based services, the file is outputted to the presentation controller 330 of the presentation processor 300.

The ESG handler 270 processes the ESG data received from the file handler 250 and stores the processed ESG data to the storage unit 290. Alternatively, the ESG handler 270 may output the processed ESG data to the ESG decoder 280, thereby allowing the ESG data to be used by the ESG decoder 280.

The storage unit 290 stores the system information (SI) received from the physical adaptation control signal handler 210 and the ESG handler 270 therein. Thereafter, the storage unit 290 transmits the stored SI data to each block.

The ESG decoder 280 either recovers the ESG data and SI data stored in the storage unit 290 or recovers the ESG data transmitted from the ESG handler 270. Then, the ESG decoder 280 outputs the recovered data to the presentation controller 330 in a format that can be outputted to the user.

The streaming handler 230 receives data from the IP network stack 220, wherein the format of the received data are in accordance with RTP and/or RTCP structures. The streaming handler 230 extracts audio/video streams from the received data, which are then outputted to the audio/video (A/V) decoder 310 of the presentation processor 300. The audio/video decoder 310 then decodes each of the audio stream and video stream received from the streaming handler 230.

The display module 320 of the presentation processor 300 receives audio and video signals respectively decoded by the A/V decoder 310. Then, the display module 320 provides the received audio and video signals to the user through a speaker and/or a screen.

The presentation controller 330 corresponds to a controller managing modules that output data received by the receiving system to the user.

The channel service manager 340 manages an interface with the user, which enables the user to use channel-based broadcast services, such as channel map management, channel service connection, and so on.

The application manager 350 manages an interface with a user using ESG display or other application services that do not correspond to channel-based services.

More specifically, the FIC handler 215 recovers the FIC chunk from the deinterleaved and RS-decoded FIC segments outputted from the signaling decoder 190. Then, the FIC handler 215 analyzes the recovered FIC chunk so as to extract the signaling information for service acquisition, thereby outputting the acquired signaling information to the physical adaptation control signal handler 216.

At this point, the FIC handler 215 recovers an FIC chunk from the FIC segment payloads based upon the FIC_type field, the FIC_segment_num field, and the FIC_last_segment_num field within each header of the FIC segments, which are recovered from one or more sub-frames decoded by the signaling decoder 190. Then, the FIC handler 215 uses the information included in the recovered FIC chunk so as to verify the ensemble in which the SGDD is included and received. Thereafter, the FIC handler 215 outputs the verified result to the physical adaptation control signal handler 216. In the present invention, reference may be made to both the ESG_EntryPoint_Location field value of the FIC chunk header and the SG_entry_point_indicator field value of the FIC chunk payload, so as to verify the ensemble in which the SGDD is included. Alternatively, only one of the two field values may be referred to, so as to verify the ensemble in which the SGDD is included.

The physical adaptation control signal handler 216 identifies an ensemble including the SGDD by using the TPC data being outputted from the TPC handler 214 and by using the SMT data being outputted from the SI handler 240. Then, the system is switched to the time-slicing mode that receives the identified ensemble, thereby controlling the baseband processor 100 so that the RS frame belonging to the ensemble can be received for each M/H frame. Subsequently, access information of the SGDD or the service guide announcement channel transmitting the SGDD is acquired from the SMT included in the received RS frame. Then, the system is controlled so that the SGDD can be received based upon the acquired access information.

Furthermore, access information of the SGDUs are acquired from the received SGDD. Then, the system accesses each FLUTE session based upon the acquired access information, so as to gather the SGDUs. Thereafter, SG data are extracted from the fragments included in the gathered SGDUs. Subsequently, the system is controlled so that the extracted SG data are stored in the storage unit 290. In a later process, when a user-request is inputted, the presentation processor 300 displays the SG information onto a display screen based upon the SG data stored in the storage unit 290.

As described above, according to the embodiment of the present invention, the access information of the service guide announcement channel including the service guide bootstrap information is signaled through an ensemble-level descriptor (e.g., SG access descriptor) of the SMT included in the service signaling channel.

According to anther embodiment of the present invention, the access information of the service guide channel including the service guide bootstrap information may be signaled through the guide access table (GAT). The GAT is included in the service signaling channel, thereby being received.

At this point, the IP datagrams of the service signaling channel share the same well-known destination IP address and the same well-known destination UDP port number. Therefore, the identification of the GAT included in the service signaling data is performed by a table identifier. More specifically, the table identifier may correspond to a table_id field existing in the corresponding table or in the header of the corresponding table section. And, when required, the identification process may be performed by further referring to the table_id_extension field. According to an embodiment of the present invention, the GAT includes an announcement_channel_TSI field, which is included in the SG access descriptor shown in FIG. 12.

If the access information of the service guide announcement channel including the service guide bootstrap information is signaled by using the GAT, the SG_entry_point_indicator field of FIG. 9 indicates whether or not the GAT is being transmitted to the service signaling channel, which is included in the corresponding ensemble. For example, when the SG_entry_point_indicator field value is equal to '1', this indicates that the GAT is transmitted to the service signaling channel included in the corresponding ensemble. Furthermore, even when the GAT is included in the service signaling channel, the flow chart of FIG. 14 and the receiving system of FIG. 15 may be used. In this case, the only difference is that the access information of the service guide announcement channel is acquired from the GAT and not from the SMT.

FIG. 16 illustrates an exemplary syntax structure of a GAT section among multiple signaling tables transmitted to the IP signaling channel according to the present invention.

Referring to FIG. 16, an identifier identifying the GAT may be set as a table_id field, which corresponds to the table identifier. Herein, the GAT of FIG. 16 assigns an 8-bit ensemble_id field and an 8-bit GAT_protocol_version field to the position of a table_id_extension field, so that the newly assigned fields may be used as one of the table identifiers for identifying the GAT, when the GAT is received through the IP signaling channel. As shown in FIG. 16, a section_syntax_indicator field corresponds to an indicator defining a GAT section format. A private_indicator field indicates to which private section the GAT belongs. A section_length field indicates the section length of the GAT.

The ensemble_id field is an 8-bit field, which corresponds to an ID value associated to the corresponding MH ensemble. Herein, the ensemble_id field may be assigned with a value ranging from range '0x00' to '0x3F'. It is preferable that the value of the ensemble_id field is derived from the parade_id of the TPC data, which is carried from the baseband processor of MH physical layer subsystem. When the corresponding MH ensemble is transmitted through (or carried over) the primary RS frame, a value of '0' may be used for the most significant bit (MSB), and the remaining 7 bits are used as the parade_id value of the associated MH parade (i.e., for the least significant 7 bits). Alternatively, when the corresponding MH ensemble is transmitted through (or carried over) the secondary RS frame, a value of '1' may be used for the most significant bit (MSB), and the remaining 7 bits are used as the parade_id value of the associated MH parade (i.e., for the least significant 7 bits).

A GAT_protocol_version field indicates the protocol version of the corresponding GAT.

A version_number field indicates the version number of the GAT. A section_number field indicates the section number of the current GAT section. A last_section_number field indicates the last section number of the GAT. A num_S-G_providers field indicates a number of SG providers described in the current GAT section. An SG_provider_id field indicates a unique indicator that can identify each SG provider. An SG_provider_name_length field indicates the total length of an SG_provider_name_text( ) field that follows. The SG_provider_name_text( ) field indicates the name of the corresponding SG provider.

A source_IP_address field represents a source IP address of a FLUTE session transmitting the service guide announcement channel.

When a value of an IP_version_flag field is set to '1', this indicates that a destination_IP_address field corresponds to an IPv6 address. And, when the value of the IP_version_flag field is set to '0', this indicates that the destination_IP_address field corresponds to an IPv4 address.

The destination_IP_address field corresponds to a 32-bit field or a 128-bit field, which represents a destination IP address of a FLUTE session transmitting the service guide announcement channel. When the IP_version_flag field is set to '0', the destination_IP_address field indicates a 32-bit destination IPv4 address for the corresponding service guide announcement channel. Alternatively, when the IP_version_flag field is set to '1', the destination_IP_address field indicates a 64-bit destination IPv6 address for the corresponding service guide announcement channel.

A destination_UDP_port_num field corresponds to a 16-bit field, which represents a destination UDP port number of a FLUTE session transmitting the service guide announcement channel. An announcement_channel_TSI field is a 16-bit field, which indicates a transmission session identifier for the FLUTE session, through which the service guide announcement channel is transmitted.

As described above, the digital broadcasting system and data processing method have the following advantages.

The present invention can signal mapping information between an ensemble and a mobile service by using an FIC chunk, and can divide and transmit the FIC chunk into FIC segment units, thereby enabling a receiving system to perform quick service acquisition.

Also, by using signaling information of an FIC chunk and signaling information being received through a service signaling channel, the present invention may efficiently identify an ensemble transmitting service guide information and may also receive service guide information from an RS frame belonging to the identified ensemble, thereby processing and using the received service guide information.

More specifically, the present invention are highly protected against (or resistant to) any error that may occur when transmitting mobile service data through a channel. And, the present invention is also highly compatible to the conventional receiving system. Moreover, the present invention may also receive the mobile service data without any error even in channels having severe ghost effect and noise. Furthermore, by inserting known data in a particular position (or place) within a data region and transmitting the processed data, the receiving performance of the receiving system may be enhanced even in a channel environment that is liable to frequent changes. Finally, the present invention is even more effective when applied to mobile and portable receivers, which are also liable to a frequent change in channel and which require protection (or resistance) against intense noise.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A receiving system for processing broadcast data, the receiving system comprising:
    a tuner to receive a broadcast signal that includes a transmission frame comprising one or more sub-frames, the transmission frame including broadcast service data for a broadcast service, first signaling information for fast service acquisition, second signaling information describing at least one component of the broadcast service, and physical layer parameters,
        wherein the first signaling information includes information for identifying whether a service guide is provided, version information related to the second signaling information, and protection information for indicating whether the at least one component is protected,
        wherein the second signaling information includes access information of a service guide delivery descriptor (SGDD) describing a service guide delivery unit (SGDU) that includes service guide data,
        wherein the access information of the SGDD includes transport session identification information, destination address information and destination port information, and
        wherein the physical layer parameters include information related to the one or more sub-frames;
    a demodulator to demodulate the received broadcast signal;
    a signaling decoder to decode the physical layer parameters in the demodulated broadcast signal; and
    a decoder to decode the broadcast service data in the demodulated broadcast signal.

2. The receiving system of claim 1, wherein the SGDU is received in a Layered Coding Transport (LCT) method of a unidirectional transport protocol.

3. The receiving system of claim 1, further comprising:
    a first handler to access the SGDD based on the first signaling information and the second signaling information; and
    a second handler to acquire the service guide data in the SGDU based on the accessed SGDD.

4. The receiving system of claim 3, wherein the acquired service guide data are at least stored in a storage unit or displayed on a screen.

5. A method of processing broadcast data in a receiving system, the method comprising:
    receiving a broadcast signal that includes a transmission frame comprising one or more sub-frames, the transmission frame including broadcast service data for a broadcast service, first signaling information for fast service acquisition, second signaling information describing at least one component of the broadcast service, and physical layer parameters,
        wherein the first signaling information includes information for identifying whether a service guide is provided, version information related to the second signaling information, and protection information for indicating whether the at least one component is protected,
        wherein the second signaling information includes access information of a service guide delivery descriptor (SGDD) describing a service guide delivery unit (SGDU) that includes service guide data,
        wherein the access information of the SGDD includes transport session identification information, destination address information and destination port information, and
        wherein the physical layer parameters include information related to the one or more sub-frames;
    demodulating the received broadcast signal;
    decoding the physical layer parameters in the demodulated broadcast signal; and
    decoding the broadcast service data in the demodulated broadcast signal.

6. The method of claim 5, wherein the SGDU is received in a Layered Coding Transport (LCT) method of a unidirectional transport protocol.

7. The method of claim 5, further comprising:
    accessing the SGDD based on the first signaling information and the second signaling information; and
    acquiring the service guide data in the SGDU based on the accessed SGDD.

8. The method of claim 7, wherein the acquired service guide data are at least stored in a storage unit or displayed on a screen.

* * * * *